(12) United States Patent
Matsuo

(10) Patent No.: US 8,331,033 B2
(45) Date of Patent: Dec. 11, 2012

(54) ZOOM OPTICAL SYSTEM AND IMAGE PICKUP APPARATUS PROVIDED WITH THE SAME

(75) Inventor: Keigo Matsuo, Akiruno (JP)

(73) Assignee: Olympus Corporation, Tokyo (JP)

( * ) Notice: Subject to any disclaimer, the term of this patent is extended or adjusted under 35 U.S.C. 154(b) by 280 days.

(21) Appl. No.: 12/661,725

(22) Filed: Mar. 22, 2010

(65) Prior Publication Data

US 2010/0265362 A1 Oct. 21, 2010

(30) Foreign Application Priority Data

Mar. 24, 2009 (JP) ................................ 2009-072027

(51) Int. Cl.
*G02B 15/14* (2006.01)
(52) U.S. Cl. ........ 359/683; 359/684; 359/685; 359/686; 359/716; 359/740; 359/781
(58) Field of Classification Search .......... 359/683–686, 359/716, 740, 781–783
See application file for complete search history.

(56) References Cited

U.S. PATENT DOCUMENTS 7,551,365 B2 6/2009 Ueda
2007/0103792 A1* 5/2007 Ueda .............................. 359/684

FOREIGN PATENT DOCUMENTS

JP 3 493 406 11/2003

* cited by examiner

*Primary Examiner* — Evelyn A. Lester
(74) *Attorney, Agent, or Firm* — Kenyon & Kenyon LLP

(57) ABSTRACT

A zoom optical system comprising, in order from the object side, a first lens unit with negative power, a second lens unit with positive power, a third lens unit with positive power, and a fourth lens unit, wherein spacing between the first lens unit and the fourth lens unit is fixed to an image surface, and the second lens unit and the third lens unit are moved on an optical axis so as to change spacings between the respective lens units when the magnification of the zoom optical system is changed. The third lens unit comprises lens elements more than three, including an aperture stop, at least a lens element with positive power and at least a lens element with negative power, and the most image-side lens element of the third lens unit is a meniscus lens element with a concave surface facing the image side.

15 Claims, 18 Drawing Sheets

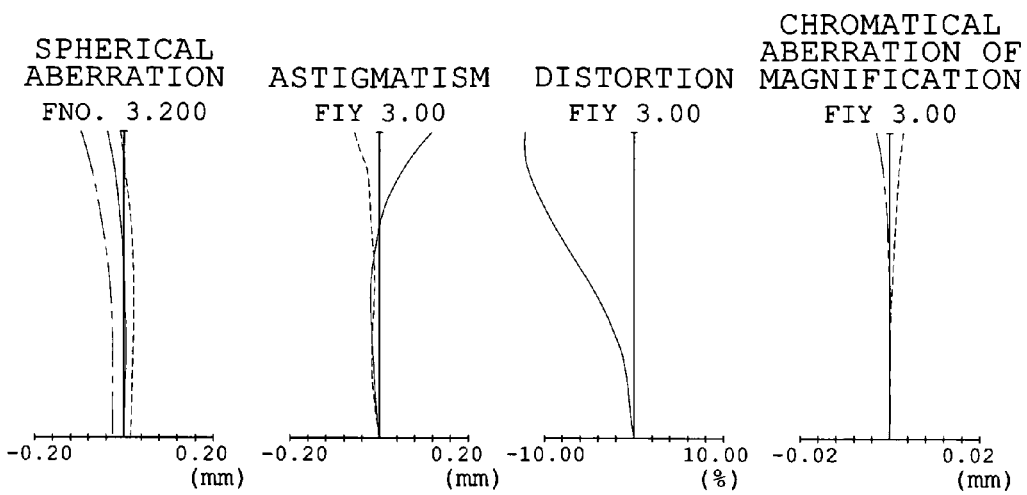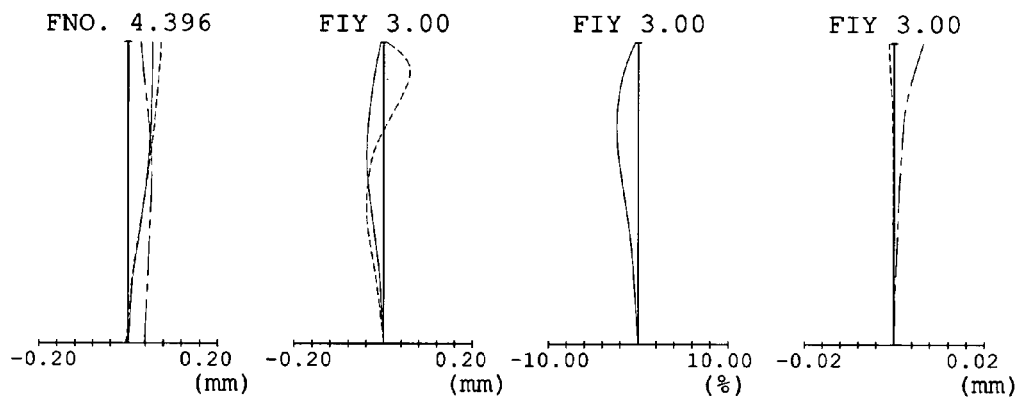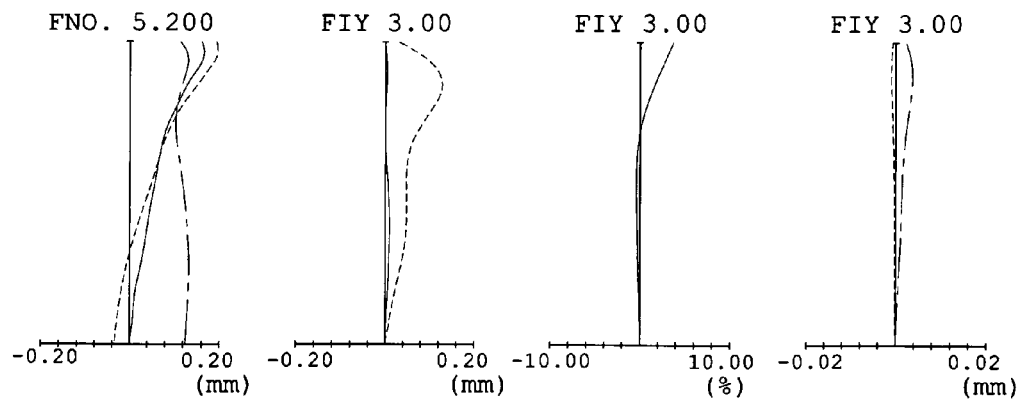

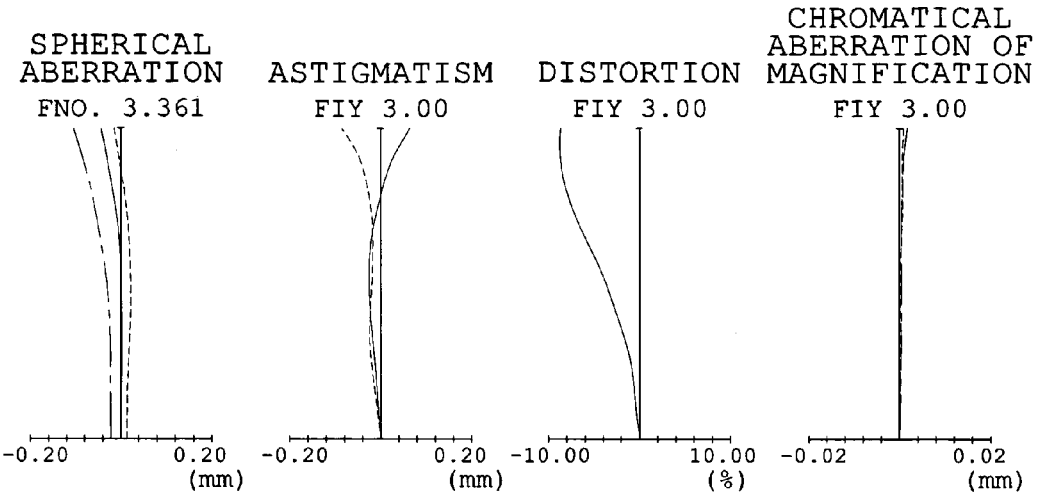
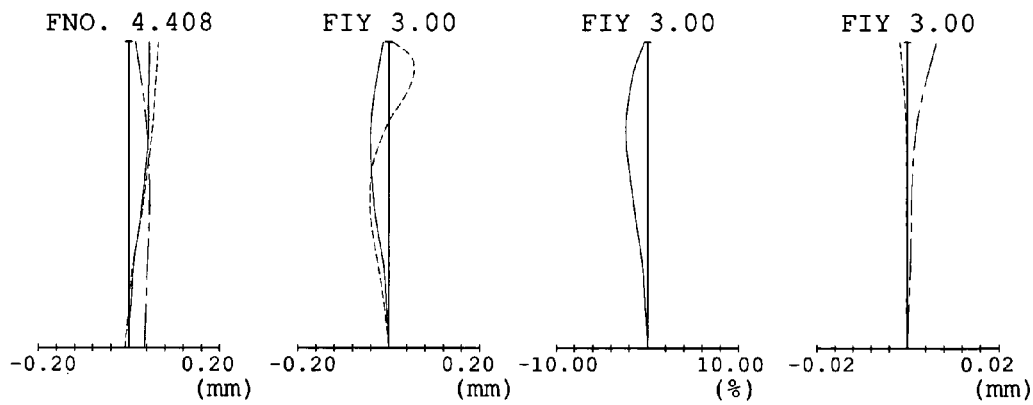
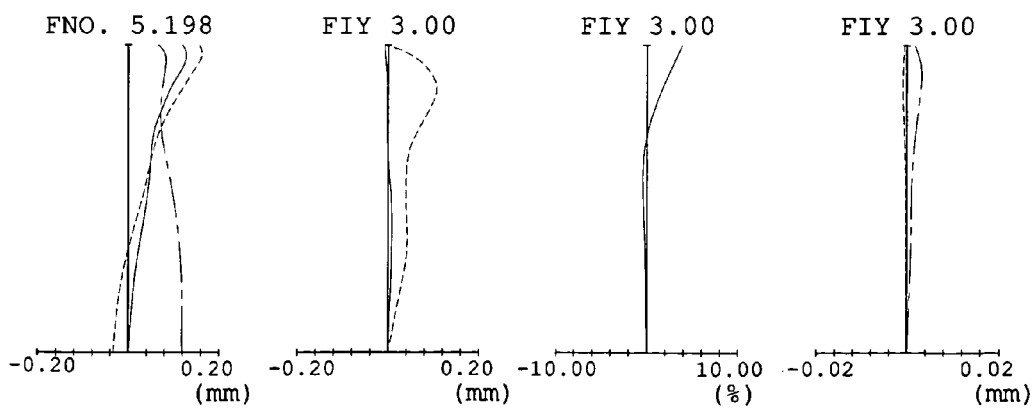

COMA AT
IMAGE HEIGHT
RATIO=0.7

COMA AT
IMAGE HEIGHT
RATIO=0.7

COMA AT
IMAGE HEIGHT
RATIO=0.7

486.13 —·—
656.27 --------
587.56 ———

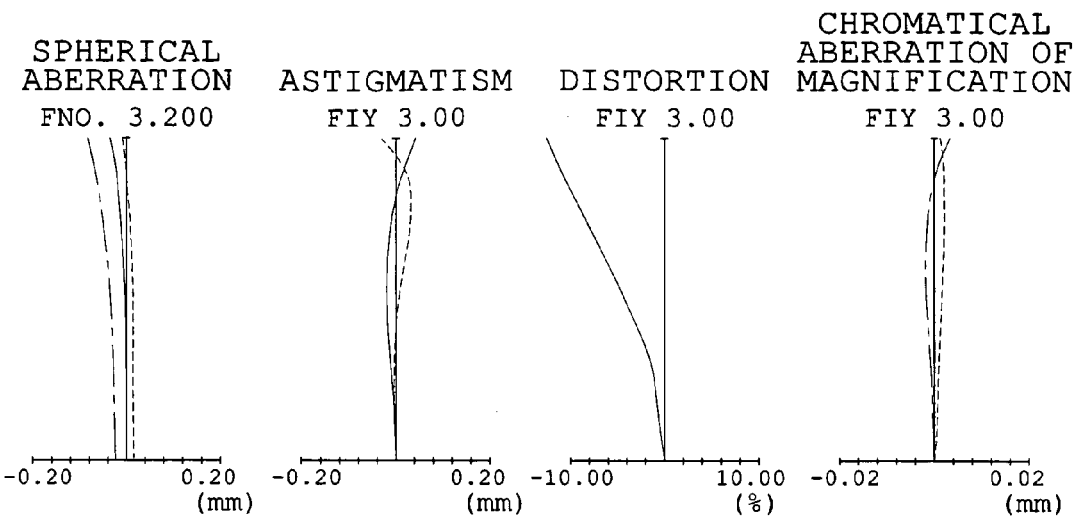
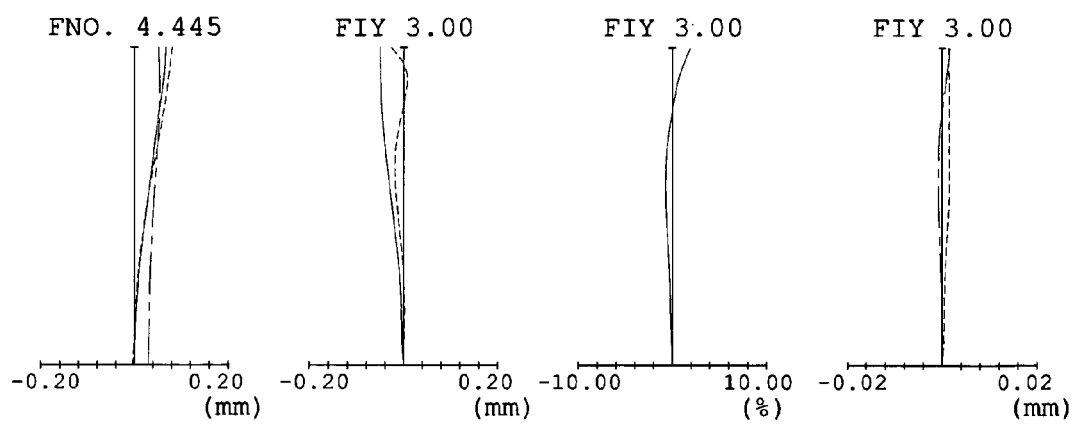
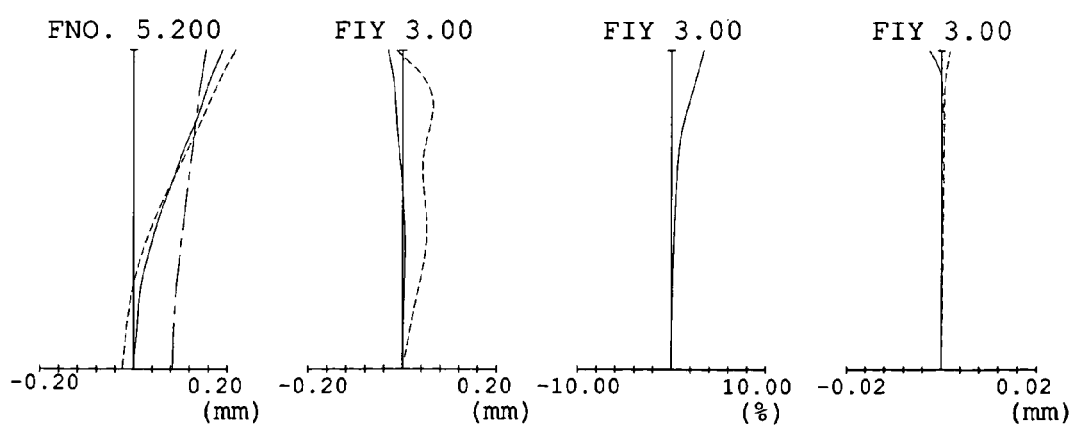
486.13 — - —
656.27 ---------
587.56 ———

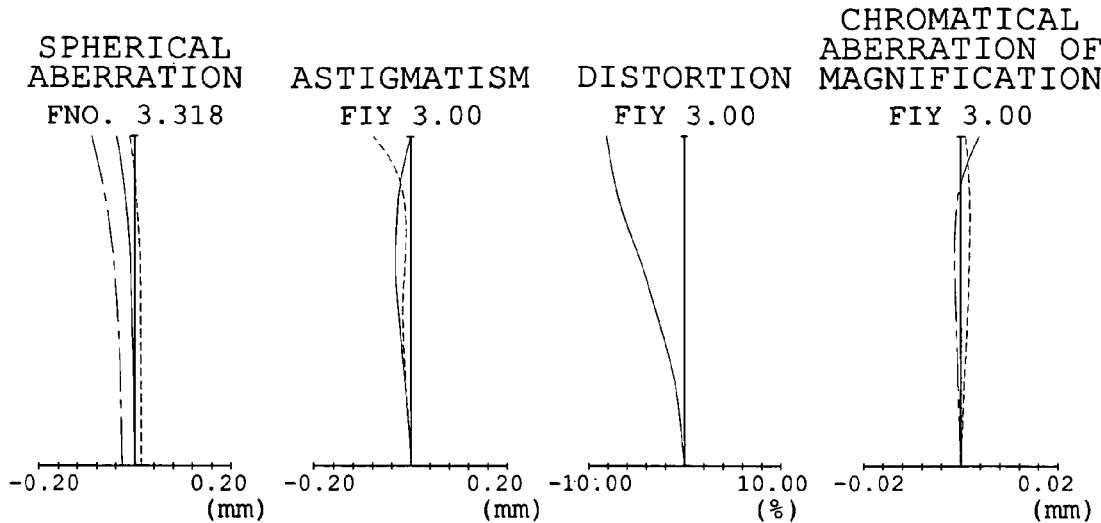
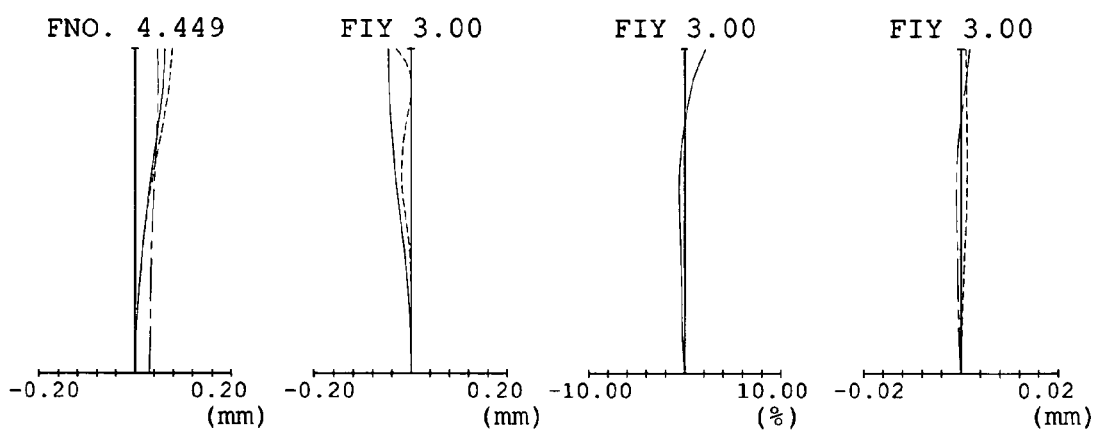
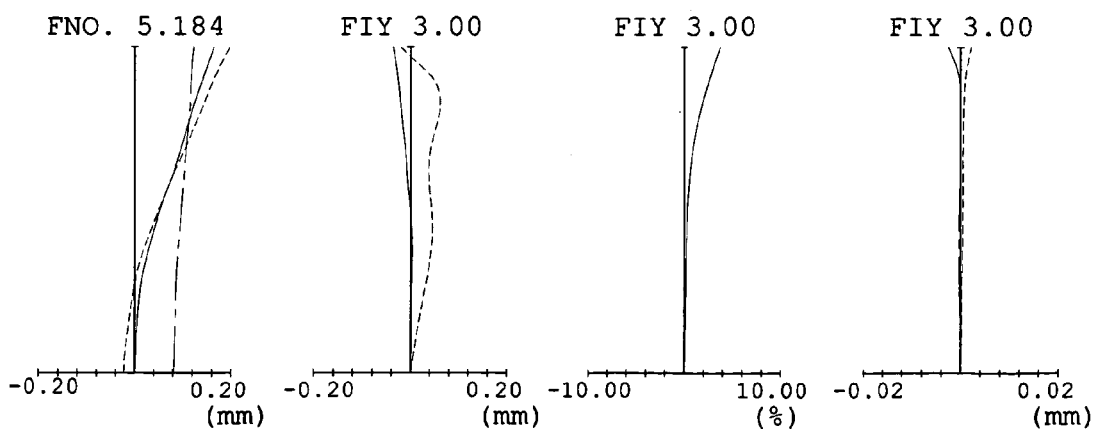

COMA AT IMAGE HEIGHT RATIO=0.7

COMA AT IMAGE HEIGHT RATIO=0.7

COMA AT IMAGE HEIGHT RATIO=0.7

486.13 —·—
656.27 ---------
587.56 ———

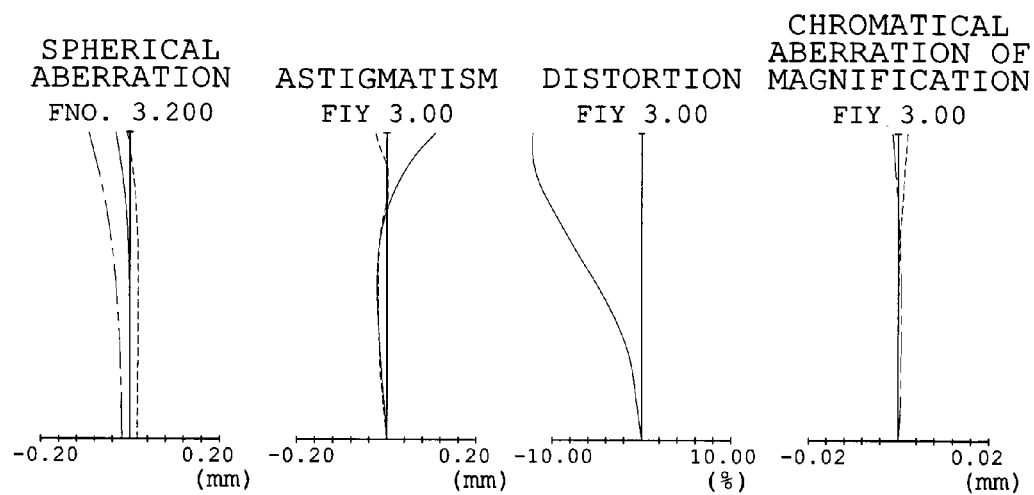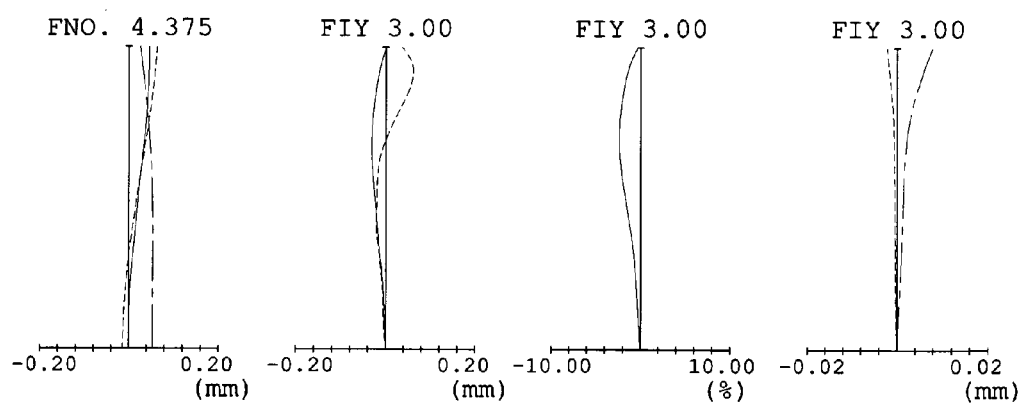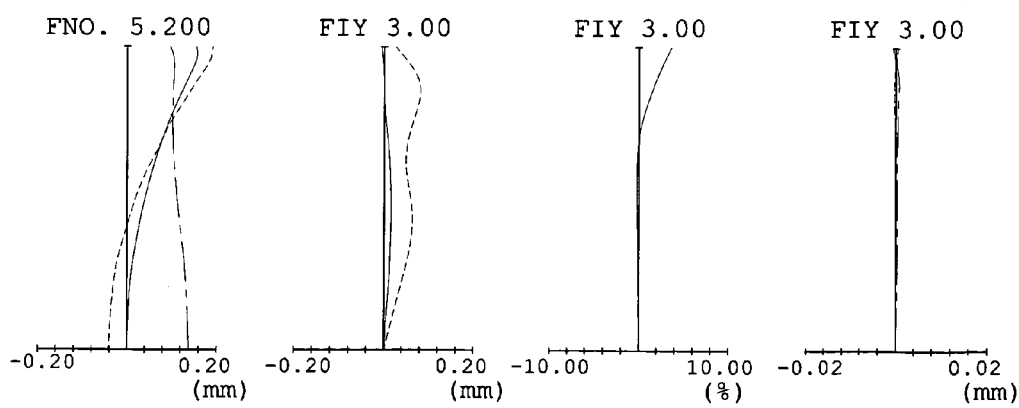

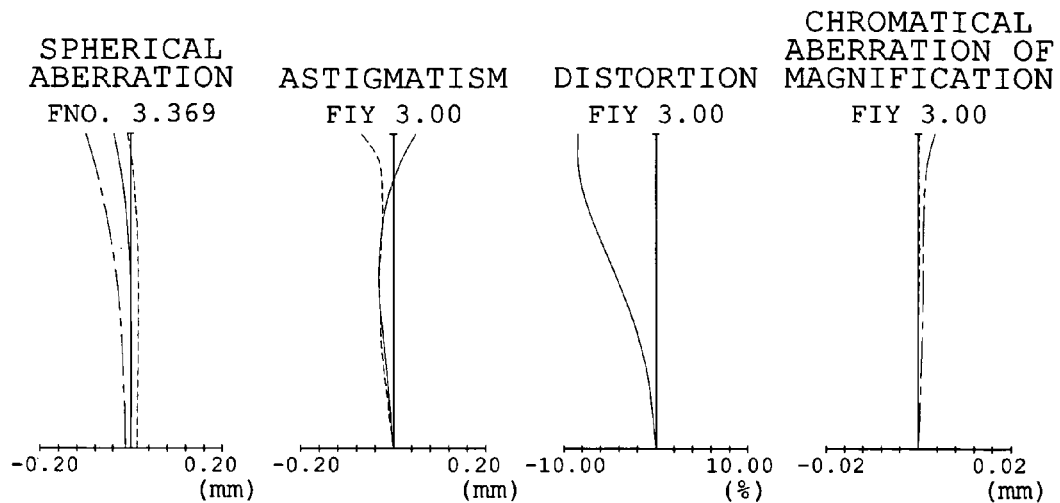
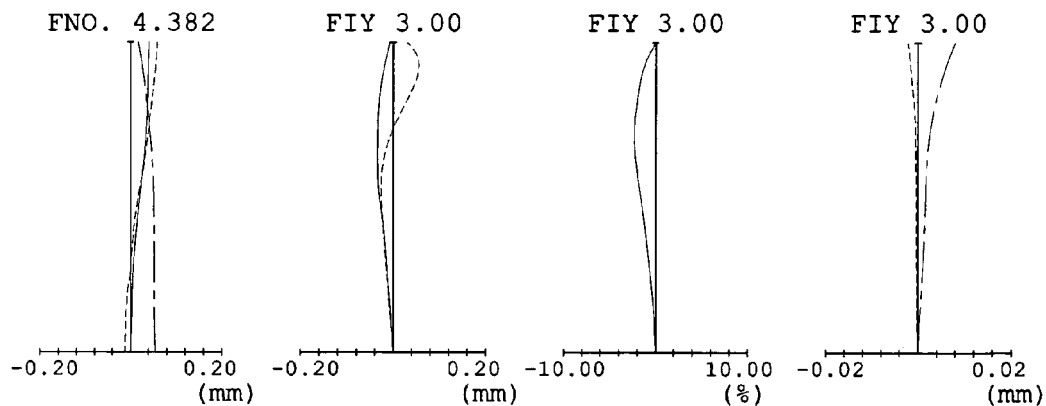
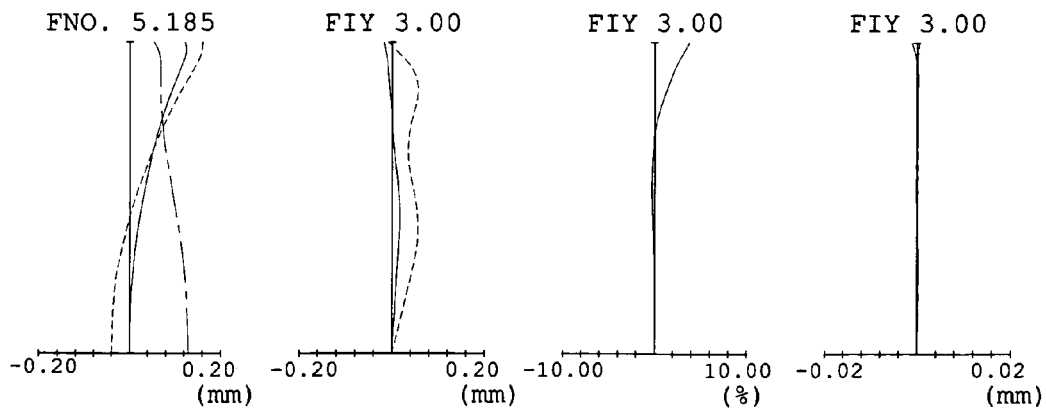

COMA AT
IMAGE HEIGHT
RATIO=0.7

COMA AT
IMAGE HEIGHT
RATIO=0.7

COMA AT
IMAGE HEIGHT
RATIO=0.7

486.13 —·—
656.27 ---------
587.56 ———

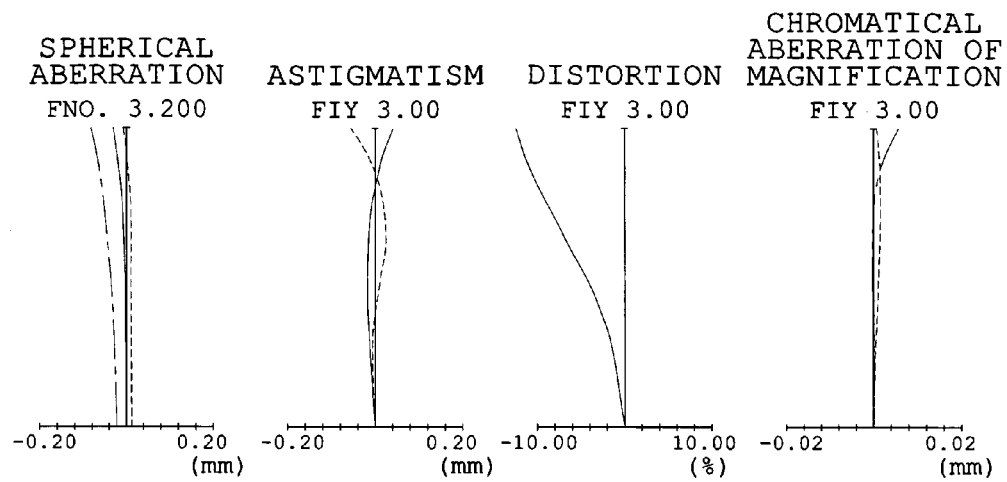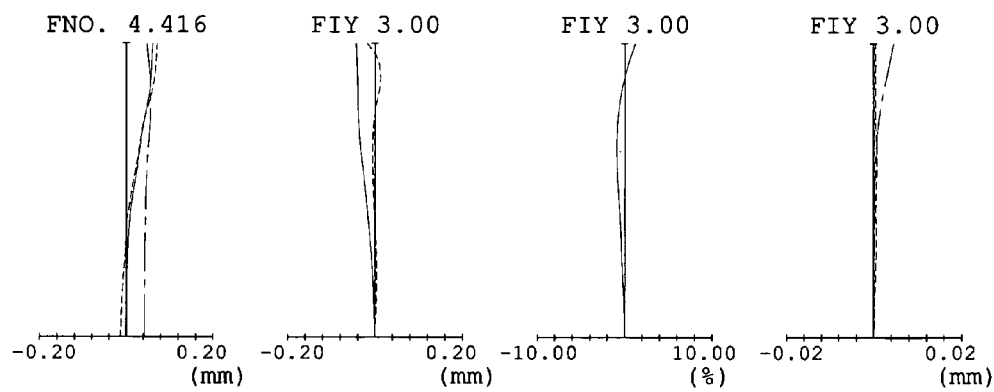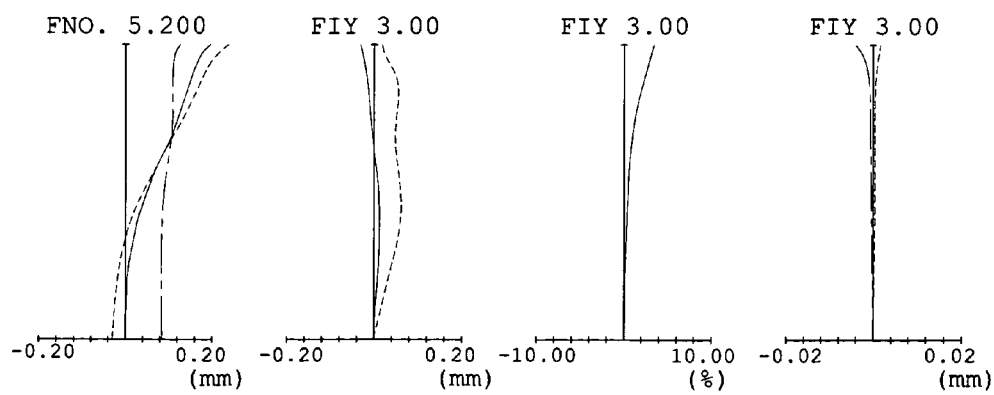

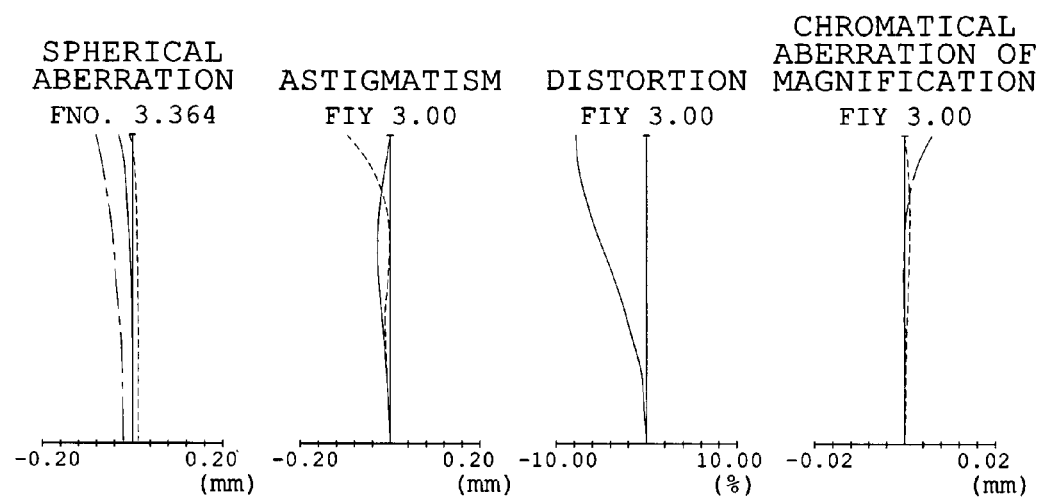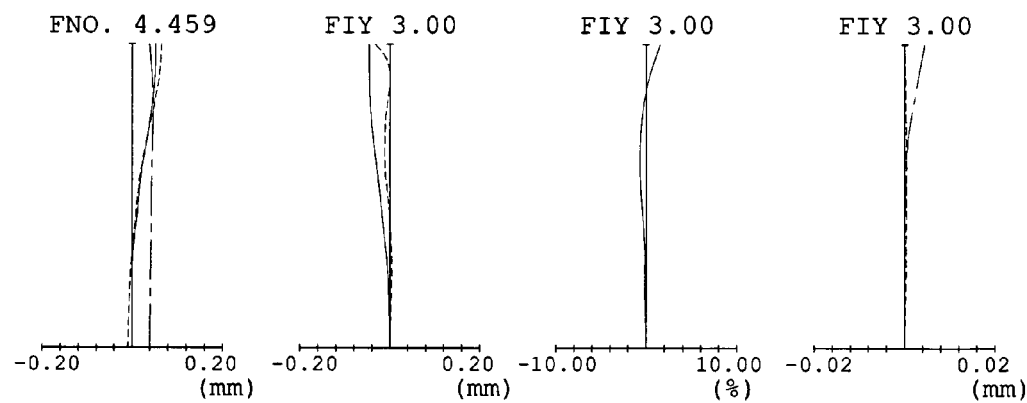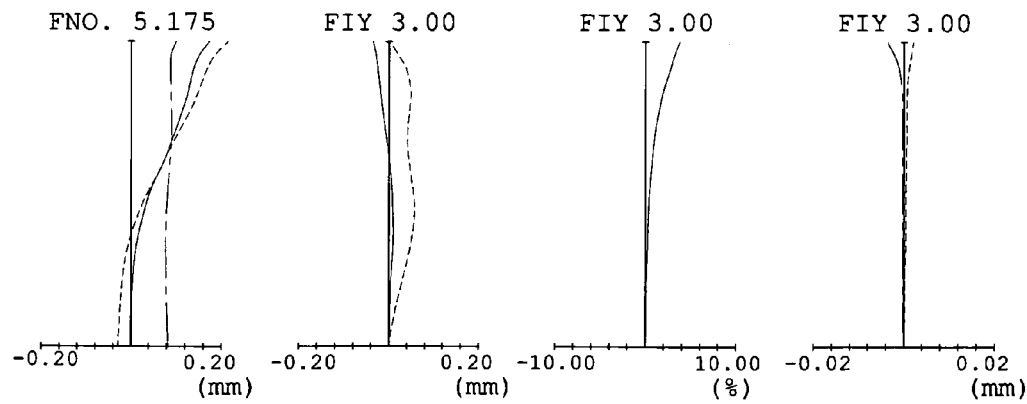

COMA AT
IMAGE HEIGHT
RATIO=0.7

COMA AT
IMAGE HEIGHT
RATIO=0.7

COMA AT
IMAGE HEIGHT
RATIO=0.7

486.13 — · —
656.27 - - - - -
587.56 ———

ZOOM OPTICAL SYSTEM AND IMAGE PICKUP APPARATUS PROVIDED WITH THE SAME

This application claims benefits of Japanese Patent Application No. 2009-72027 filed in Japan on Mar. 24, 2009, the contents of which are hereby incorporated by reference.

BACKGROUND OF THE INVENTION

1. Field of the Invention

The present invention relates to a zoom optical system and an image pickup apparatus provide with the same.

2. Description of the Related Art

In recent years, instead of silver-halide film cameras, digital cameras provided with solid-state image sensors, such as CCDs (charge coupled devices) and CMOSs (complementary metal-oxide semiconductors), have constituted the main current. Such digital cameras are available in various types ranging from a high-function type for business use to a popular compact type. Of these, the popular compact type of digital camera has come to require a slim design, in addition to a compact design, so that the camera can be easily put into the pocket of clothing or bag and is handy to carry, in order to meet the need of a user who wants to readily enjoy photography. It is important that such small sized digital cameras are required to be hard and anti-dusty, because they are used and kept at any place.

Consequently, for a zoom optical system used in such digital cameras, a compacter design is required, and substantial quality and high dust-proof characteristic are required. A zoom optical system satisfying such requirements is shown in Japanese Patent No. 3493406 and Japanese patent Kokai No. 2007-156417.

The zoom optical system shown in Japanese patent No. 349406 comprises a first lens unit with negative power, a second lens unit with positive power, a third lend unit with positive power and a fourth lens unit with positive power. And, each lens unit is made of one plastic lens, respectively, the first and fourth lens units are stationary, and the variation of magnification is taken place by moving the second and third lens units on the optical axis.

Further, the zoom optical system shown in Japanese patent Kokai No. 2007-156417 comprises a first lens unit with negative power, a second lens unit with positive power, a third lens unit with positive power, and a fourth lens unite with positive power. And, the third lens unit comprises an aperture stop, a lens with positive power and a lens with negative power, the first and fourth lens units are stationary, and the second and third lens units are adapted to be moved upon zooming.

SUMMARY OF THE INVENTION

The zoom optical system according to the present invention includes, in order from the object side, a first lens unit with negative power, a second lens unit with positive power, a third lens unit with positive power, and a fourth lens unit; the positions of the first lens unit and the fourth lens unit are fixed to an image surface; and the second lens unit and the third lens unit are moved on an optical axis so as to change spacings between the respective lens units of the zoom optical system when the magnification of the zoom optical system is changed, characterized in that the third lens unit includes an aperture stop and at least three lens elements that include at least a lens element with positive power and at least a lens element with negative power, and that the most image-side lens element of the third lens unit is a meniscus lens element with a concave surface facing the image side.

Also, in the zoom optical system of the present invention, the third lend unit comprises, in order from the object side, an aperture stop, a lens element with positive power, a lens element with negative power and a meniscus lens element with a concave surface facing the image side, and it is preferable to satisfy the following condition (1):

$$-1.0 < HF3g/fw < -0.55 \quad (1)$$

where HF3g is a front principal point position of the third lens unit, and fw is a focal length of the entire system in the wide-angle end position.

Also, according to a preferable embodiment of the present invention, the zoom optical system satisfies preferably the following condition (1-1):

$$-0.8 < HF3g/fw < -0.57 \quad (1-1)$$

Also, in the zoom optical system of the present invention, the third lens unit includes, in order from the object side, an aperture stop, a lens element with positive power, a lens element with negative power and a meniscus lens element with a concave surface facing the image side, and it is preferable to satisfy the following condition (2):

$$0.72 < SD3g/fw < 1.50 \quad (2)$$

where SD3g is the distance from the most object-side lens surface to the most image-side lens surface of the third lens unit, and fw is a focal length of the entire system in the wide-angle end position.

Also, according to a preferable embodiment of the present invention, the zoom optical system satisfies preferably the following condition (2-1):

$$0.73 < SD3g/fw < 1.40 \quad (2-1)$$

Also, in the zoom optical system of the present invention, it is preferable to satisfy the following conditions (3) and (4):

$$1.40 < ndeo < 1.74 \quad (3)$$

$$15.0 < vdeo < 35.0 \quad (4)$$

where ndeo is a refractive index of the lens element (eo) having the strongest negative power in the third lens unit, and vdeo is the Abbe's number of the lens element (eo) having the strongest negative power in the third lens unit.

Also, according to a preferable embodiment of the present invention, the zoom optical system satisfies preferably the following conditions (3-1) and (4-1):

$$1.47 < ndeo < 1.67 \quad (3-1)$$

$$16.0 < vdeo < 31.0 \quad (4-1)$$

Also, in the zoom optical system of the present invention, it is preferable to satisfy the following condition (5):

$$1.40 < nd < 1.726 \quad (5)$$

where nd is a refractive index of any lens element (excepting the lens element (eo)) arranged in or after the second lens unit.

Also, according to a preferable embodiment of the present invention, the zoom optical system satisfies preferably the following condition (5.1):

$$1.47 < nd < 1.67 \quad (5-1)$$

Also, in the zoom optical system of the present invention, it is preferable that in the fourth lens unit, positive power of the peripheral portion of the most object side lens surface becomes strong by having a concave surface facing to the object side at the peripheral portion within an effective range.

Also, in the zoom optical system of the present invention, it is preferable to satisfy the following conditions (6) and (7):

$$0.1 < fw/f3g < 3.0 \quad (6)$$

$$-3.0 < f3g/R4g1 < 3.0 \quad (7)$$

where R4g1 is a radius of curvature of the most object side lens surface of the fourth lens unit, f3g is a focal length of the third lens unit, and fw is a focal length of the entire optical system at the wide angle end position.

Also, according to the preferable embodiment of the present invention, the zoom optical system satisfies preferably the following conditions (6-1) and (7-1):

$$0.4 < fw/f3g < 1.5 \quad (6-1)$$

$$-1.5 < f3g/R4g1 < 1.5 \quad (7-1)$$

Also, in the zoom optical system of the present invention, the fourth lens unit comprises preferably one lens element.

Also, in the zoom optical system of the present invention, the fourth lens unit has preferably a positive power.

Also, in the zoom optical system of the present invention, focusing is preferably performed by movement of the second and third lens units along the optical axis to change distances between the respective lens units of the zoom optical system.

Also, the image pickup apparatus provided with the zoom optical system of the present invention is characterized in that the zoom optical system of the present invention and an electronic image pickup element are provided.

According to the present invention, in spite of a compact zoom optical system in which the spacing between the first lens unit and the image surface does not vary, the zoom optical system in which chromatic aberration, spherical aberration, astigmatism and coma are amended in a good manner, and an image pickup apparatus provided with the zoom optical system can be supplied.

These and other features and advantages of the present invention will become apparent from the following detailed description of the preferred embodiments when taken in conjunction with the accompanying drawings.

BRIEF DESCRIPTION OF THE DRAWINGS

FIGS. 2A-2L are aberration diagrams in the infinite far position of the first embodiment. FIGS. 2A, 2B, 2C, and 2D show spherical aberration, astigmatism, distortion, and chromatic aberration of magnification, respectively, in the wide-angle end position. FIGS. 2E, 2F, 2G and 2H show spherical aberration, astigmatism, distortion, and chromatic aberration of magnification, respectively, in the intermediate position. FIGS. 2I, 2, 2K, and 2L show spherical aberration, astigmatism, distortion, and chromatic aberration of magnification, respectively, in the telephoto end position.

FIGS. 3A-3L are aberration diagrams in the closest position of the first embodiment. FIGS. 3A, 3B, 3C, and 3D show spherical aberration, astigmatism, distortion, and chromatic aberration of magnification, respectively, in the wide-angle end position. FIGS. 3E, 3F, 3G, and 3H show spherical aberration, astigmatism, distortion, and chromatic aberration of magnification, respectively, in the intermediate position. FIGS. 3I, 3J, 3K, and 3L show spherical aberration, astigmatism, distortion, and chromatic aberration of magnification, respectively, in the telephoto end position.

FIGS. 4A, 4B, and 4C show the conditions in the wide-angle end position, the middle position, and the telephoto end position, respectively, at the infinite far position. FIGS. 4D, 4E, 4F show the conditions in the wide-angle position, the middle position, and the telephoto and position, respectively, at the closest position.

FIGS. 6A-6L are aberration diagrams in the infinite far position of the second embodiment. FIGS. 6A, 6B, 6C, and 6D show spherical aberration, astigmatism, distortion, and chromatic aberration of magnification, respectively, in the wide-angle end position. FIGS. 6E, 6F, 6G, and 6H show spherical aberration, astigmatism, distortion, and chromatic aberration of magnification, respectively, in the intermediate position. FIGS. 6I, 6J, 6K, and 6L show spherical aberration, astigmatism, distortion, and chromatic aberration of magnification, respectively, in the telephoto end position.

FIGS. 7A-7L are aberration diagrams in the closest position of the second embodiment. FIGS. 7A, 7B, 7C, and 7D show spherical aberration, astigmatism, distortion, and chromatic aberration of magnification, respectively, in the wide-angle end position. FIGS. 7E, 7F, 7G and 7H show spherical aberration, astigmatism, distortion, and chromatic aberration of magnification, respectively, in the middle position. FIGS. 7I, 7J, 7K, and 7L show spherical aberration, astigmatism, distortion, and chromatic aberration of magnification, respectively, in the telephoto end position.

FIGS. 8A, 8B, and 8C show the conditions in the wide-angle end position, the middle position, and the telephoto end position, respectively, at the infinite far position. FIGS. 8D, 8E, 8F show the conditions in the wide-angle position, the middle position, and the telephoto and position, respectively, at the closest position.

FIGS. 10A-10L are aberration diagrams in the infinite far position of the third embodiment. FIGS. 10A, 10B, 10C, and 10D show spherical aberration, astigmatism, distortion, and chromatic aberration of magnification, respectively, in the wide-angle end position. FIGS. 10E, 10F, 10G and 10H show spherical aberration, astigmatism, distortion, and chromatic aberration of magnification, respectively, in the middle position. FIGS. 10I, 10J, 10K, and 10L show spherical aberration, astigmatism, distortion, and chromatic aberration of magnification, respectively, in the telephoto end position.

FIGS. 11A-11L are aberration diagrams in the closest position of the third embodiment. FIGS. 11A, 11B, 11C, and 11D show spherical aberration, astigmatism, distortion, and chromatic aberration of magnification, respectively, in the wide-angle end position. FIGS. 11E, 11F, 11G and 11H show spherical aberration, astigmatism, distortion, and chromatic aberration of magnification, respectively, in the middle position. FIGS. 11I, 11J, 11K, and 11L show spherical aberration, astigmatism, distortion, and chromatic aberration of magnification, respectively, in the telephoto end position.

FIGS. 12A, 12B, and 12C show the conditions in the wide-angle end position, the middle position, and the telephoto end position, respectively, at the infinite far position. FIGS. 12D, 12E, 12F show the conditions in the wide-angle position, the middle position, and the telephoto and position, respectively, at the closest position.

FIGS. 14A-14L are aberration diagrams in the infinite far position of the fourth embodiment. FIGS. 14A, 14B, 104, and 14D show spherical aberration, astigmatism, distortion, and chromatic aberration of magnification, respectively, in the wide-angle end position. FIGS. 14E, 14F, 14G and 14H show spherical aberration, astigmatism, distortion, and chromatic aberration of magnification, respectively, in the middle position. FIGS. 14I, 14J, 14K, and 14L show spherical aberration, astigmatism, distortion, and chromatic aberration of magnification, respectively, in the telephoto end position.

FIGS. 15A-15L are aberration diagrams in the closest position of the fourth embodiment. FIGS. 15A, 15B, 15C, and 15D show spherical aberration, astigmatism, distortion, and chromatic aberration of magnification, respectively, in the wide-angle end position. FIGS. 15E, 15F, 15G and 15H show spherical aberration, astigmatism, distortion, and chromatic aberration of magnification, respectively, in the middle position. FIGS. 15I, 15J, 15K, and 15L show spherical aberration, astigmatism, distortion, and chromatic aberration of magnification, respectively, in the telephoto end position.

FIGS. 16A, 16B, and 16C show the conditions in the wide-angle end position, the middle position, and the telephoto end position, respectively, at the infinite far position. FIGS. 12D, 12E, 12F show the conditions in the wide-angle position, the middle position, and the telephoto and position, respectively, at the closest position.

DETAILED DESCRIPTION OF THE PREFERRED EMBODIMENTS

Figure 1A:
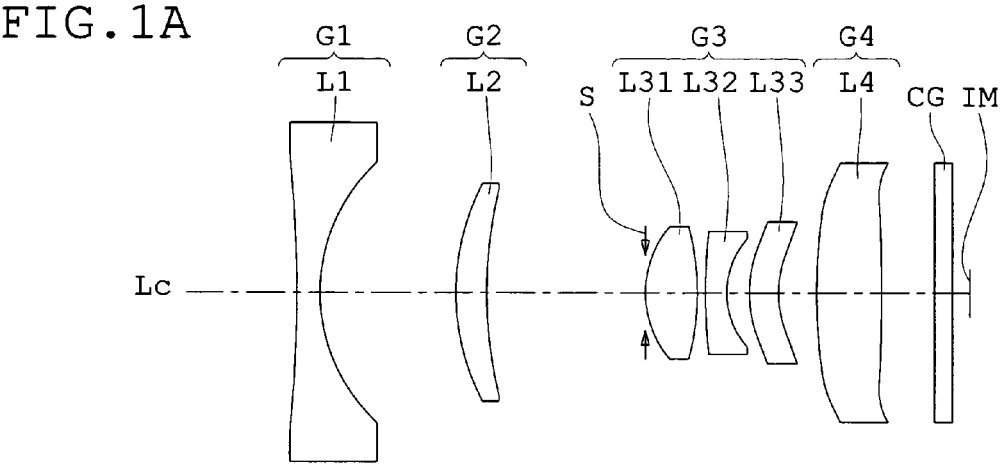
FIGS. 1A, 1B and 1C are sectional views of a zoom optical system according to the first embodiment of the present invention, taken along the optical axis, and show the conditions in the wide-angle end position, the middle position, and the telephoto end position, respectively.

Before undertaking the description of the embodiments, the function and effect of the zoom optical system according to the present invention will be explained.

The zoom optical system of the present invention includes, in order from the object side, a first lens unit with negative power, a second lens unit with positive power, a third lens unit with positive power, and a fourth lens unit; the positions of the first lens unit and the fourth lens unit are fixed to an image surface; and the second lens unit and the third lens unit are moved on an optical axis so as to change distances between the respective lens units of the zoom optical system when the magnification of the zoom optical system is changed, wherein the third lens unit includes an aperture stop and at least three lens elements that include at least a lens element with positive power and at least a lens element with negative power, and the most image-side lens element of the third lens unit is a meniscus lens element with a concave surface facing the image side.

In the zoom optical system of the present invention, the positions of the first lens unit and the fourth lens unite are fixed to the image surface when the magnification is changed. Whereby, it becomes easy to make better the degree of seal of the zoom optical system to the camera body. As the result, a zoom optical system and an image pickup apparatus provided with the same, having excellent dust-proof ability and enough strength can be obtained.

Also, the chromatic aberration can be amended in good manner by having at least a positive lens element and at least a negative lens element in the third lens unit which is the largest in the amount of movement. Also, as the third lens unit includes the aperture stop, the effective diameter of the lens elements constituting the third lens unit and the diameter of the aperture stop can be made substantially the same. Further, as the third lens unit has the meniscus lens element with a concave surface at the most image side, the astigmatism and the coma can be amended in good manner.

Also, in the zoom optical system of the present invention, the third lend unit preferably comprises an aperture stop and three lens elements, in which the aperture stop, the lens element with positive power, the lens element with negative power and the meniscus lens element with a concave surface facing the image side are arranged in order from the object side, and it is good to satisfy the following condition (1):

$$-1.0 < HF3g/fw < -0.55 \tag{1}$$

where HF3g is a front principal point position of the third lens unit, and fw is a focal length of the entire system in the wide-angle end position.

The condition (1) shows that the front principal point of the third lens unit is located at a more object-side position than the top of the most object-side surface of the third lens unit. If the condition (1) is satisfied, change of the magnification can be carried out effectively without a physical interference in a limited space for movement of the lens units.

If HF3g/fw is below the lower limit of the condition (1), the front principal point of the third lens unit becomes too near the object side, so that the position of the third lens unit becomes near the image surface, and therefore the third lens unit results in interfering with the fourth lens unit.

If HF3g/fw is beyond the upper limit value of the condition (1), the front principal point of the third lens unit becomes near the top of the lens surface of the third lens unit, so that the position of the third lens unit becomes near the second lens unit at the telephoto end position, and therefore the magnification cannot be changed effectively.

Also, the zoom optical system of the present invention is more preferable if the following condition (1.1) is satisfied:

$$-0.8 < HF3g/fw < -0.57 \tag{1-1}$$

If the zoom optical system of the present invention satisfies the condition (1-1), the front principal point of the third lens unit is shown to be positioned at the object side more than the top of the lens surface in the most object side of the third lens unit, so that the change of the magnification can be carried out efficiently without interfering physically between the lens units.

Also, in the zoom optical system of the present invention, the third lens unit preferably includes an aperture stop and three lens elements, wherein, in order from the object side, the aperture stop, a lens element with positive power, a lens element with negative power and a meniscus lens element with a concave surface facing the image side are arranged, and it is preferable to satisfy the following condition (2):

$$0.72 < SD3g/fw < 1.50 \tag{2}$$

where SD3g is the distance from the most object-side lens surface to the most image-side lens surface of the third lens unit, and fw is a focal length of the entire system in the wide-angle end position.

The condition (2) limits the total sum of distances between the lens surfaces of the third lens unit. If the condition (2) is satisfied, the distance between the most object-side convex surface and the most image-side concave surface can be arranged suitably. As the result, in every magnification state, the spherical aberration can be compensated for in good manner at the convex surface, and the astigmatism and the coma can be compensated for in good manner at the concave surface.

If SD3g/fw is below the lower limit value of the condition (2), the concave surface becomes too near to the convex surface, so that compensation for astigmatism becomes insufficient. If SD3g/fw is beyond the upper limit value of the condition (2), the concave surface becomes too far to the convex surface of the object side, so that compensation for coma becomes insufficient.

Also, the zoom optical system of the present invention is more preferable if the following condition (2-1) is satisfied:

$$0.73 < SD3g/fw < 1.40 \tag{2-1}$$

If the condition (2-1) is satisfied, the distance between the convex surface of the most object side and the concave surface of the most image side can be arranged more suitably, so that various aberrations can be compensated for suitably.

Also, the zoom optical system of the present invention is preferable if the following conditions (3) and (4) are satisfied:

$$1.40 < ndeo < 1.74 \tag{3}$$

$$15.0 < vdeo < 35.0 \tag{4}$$

where ndeo is a refractive index of the lens element (eo) having the strongest negative power in the third lens unit, and vdeo is the Abbe's number of the lens element (eo) having the strongest negative power in the third lens unit.

The condition (3) shows the refractive index of the lens element (eo) having the strongest negative power in the third lens unit.

Generally, if it is desired to attain a compact zoom optical system, it is effective to strengthen the power of each lens unit. From the viewpoint of the paraxial amount, there is a method of making higher the refractive index of each lens element or a method of malting smaller the radius of curvature, in order to strengthen the power of a lens element. From the viewpoint of the aberration revision, the freedom of the shape of a lens element is necessary in order to revise adequately the on-axis and off-axis various aberrations. The effect by the refraction and the effect by the difference between the on-axis light ray incident position and the off-axis light ray incident position are obtained by elevating the degree of freedom, in other words, by increasing the amount of change in the radial direction. Further, from the viewpoint of the manufacture of lens elements, if the refractive index is made high, the condition for processing the thickness of the middle portion, peripheral portion or the like of a lens element becomes severe. In view of these facts, the degree of freedom of the shape of the lens element becomes high by lowering the refractive index, and the on-axial and the off-axial aberrations can be revised adequately while attaining a desired power.

If ndeo is below the lower limit value of the condition (3), a desired optical system can not be attained because the glass material does not exist. If ndeo is beyond the upper limit value of the condition (3), the degree of freedom of the shape becomes low, and the revision ability of the on-axial and off-axial aberrations result in lowering.

The condition (4) shows a refractive index of the lens element (eo) having the strongest negative power in the third lens unit. If vdeo is below the lower limit value of the condition (4), the Abbe's number becomes too small, so that the compensation of the first order-chromatic aberration (the on-axial chromatic aberration) becomes over. If vdeo is beyond the upper limit value of the condition (4), the Abbe's number becomes too large, so that the compensation of the first order-chromatic aberration (the on-axial chromatic aberration) becomes insufficient.

Also, the zoom optical system of the present invention is more preferable if the following conditions (3-1) and (4-1) are satisfied:

$$1.47 < ndeo < 1.67 \tag{3-1}$$

$$16.0 < vdeo < 31.0 \tag{4-1}$$

If the condition (3-1) is satisfied, the degree of freedom of the shape of the lens elements becomes high while attaining a desired power, the on-axial and the off-axial aberrations can be compensated adequately. If the condition (4-1) is satisfied, the chromatic aberration can be compensated more adequately.

Also, the zoom optical system of the present invention is more preferable if the following condition (5) is satisfied:

$$1.40 < nd < 1.726 \tag{5}$$

where nd is a refractive index of any lens element (excepting the lens element (eo) having the strongest negative power in the third lens unit) of the second and subsequent lens units.

The condition (5) shows a refractive index of any lens element in the second and subsequent lens units. However, the lens element (eo) having the strongest negative power is excepted. If nd is below the lower limit value of the condition (5), a desired optical system can not be attained because there is no existing glass material. If nd is beyond the upper limit value of the condition (5), the degree of the freedom of the shape of the lens element becomes low, and the ability of the compensation of the on-axial and off-axial aberrations lower.

Also, the zoom optical system of the present invention is more preferable if the following condition (5-1) is satisfied:

$$1.47 < nd < 1.67 \tag{5-1}$$

If the condition (5-1) is satisfied, the degree of freedom of the shape of the lens elements becomes higher while attaining a desired power, the on-axial and the off-axial aberrations can be compensated adequately.

Also, in the zoom optical system of the present invention, it is preferable that the surface of the lens of the most object side in the fourth lens unit is convex to the object side in its peripheral portion within an effective range, whereby, the positive power becomes strong in the peripheral portion. It can be restrained that the incident angle of the off-axial light ray which enters to the image pickup element becomes too large by having a convex surface faced to the object side in the peripheral portion and by making strong positive power of the peripheral portion. Further, the distortion and the astigmatism of high order can be adequately compensated.

Also, the zoom optical system of the present invention is preferable if the following conditions (6) and (6) are satisfied:

$$0.1 < fw/f3g < 3.0 \tag{6}$$

$$-3.0 < f3g/R4g1 < 3.0 \tag{7}$$

where R4g1 is a radius of curvature of the most object side lens surface of the fourth lens unit, f3g is a focal length of the third lens unit, and fw is a focal length of the entire optical system at the wide angle end position.

The condition (6) shows that power of the third lens unit is positive. The condition (7) shows the size of on-axis radius of curvature in the radius of curvature (R4g1) of the most object side lens surface. The peripheral portion of lens can keep the shape continued on the shape of the lens having a convex surface facing to the object side by satisfying the conditions (6) and (7).

If fw/f3g is below the lower limit value of the condition (6), the power of the main lens unit for varying magnification is insufficient, so that compact zoom optical system can not be attained. If fw/f3g is beyond the upper limit value of the condition (6), the positive power of the main lens unit for varying magnification becomes over, so that the compensation of curvature of field becomes insufficient. If f3g/R4g1 is below the lower limit value of the condition (7), the radius of curvature of the concave surface in the radius of curvature (R4g1) of the most object side lens surface becomes too small, so that it becomes difficult to continue the shape of the peripheral portion to the shape having a convex surface faced to the object side. If f3g/R4g1 is beyond the upper limit value of the condition (7), the radius of curvature of the convex surface in the radius of curvature (R4g1) of the most object side lens surface becomes too large, so that it becomes difficult to keep the shape of the peripheral portion continued to the shape having a convex surface faced to the object side.

Also, the zoom optical system of the present invention is more preferable if the following conditions (6-1) and (7-1) are satisfied:

$$0.4 < fw/f3g < 1.5 \tag{6-1}$$

$$-1.5 < f3g/R4g1 < 1.5 \tag{7-1}$$

If the conditions (6-1) and (7-1) are satisfied, it is possible to keep the shape of the peripheral portion continued to the shape having a convex surface faced to the object side.

Also, in the zoom optical system of the present invention, it is preferable that the fourth lens unit consists of one lens. Also, it is preferable that the fourth lens unit has a positive power. A compact zoom optical system can be attained by constituting the fourth lens unit with one lens.

Also, in the zoom optical system of the present invention, it is preferable that focusing is carried out by moving along the optical axis so as to vary the spacing between the second lens unit and the third lens unit both of which are movable.

In the zoom optical system in which its total length is fixed, when the total length is shortened, a ratio of the total sum of air spaces between each lens unit to the total length decreases generally, so that when the magnification is varied, it is necessary that power of the main lens unit for varying magnification is made strong, and that the amount of movement of each movable lens unit is made small. Likewise, when focusing is carried out, it is necessary that power of the focusing lens unit is made strong, and that the amount of movement of the focusing lens unit is made small when the position of object comes near. However, if the power of the focusing lens unit is made strong, the variation of aberrations (spherical aberration, distortion) becomes large, and therefore, a desirable optical performance does not obtain.

Because of the above-mentioned reasons, the focusing is made so as to carry out by moving the second and the third lens units along the optical axis. The variation of aberrations is controlled, and the desirable optical performance can be obtained.

Further, the image pickup apparatus provided with the zoom optical system of the present invention has a zoom optical system of the present invention and an electronic image pickup element.

All of the zoom optical system of the present invention supposes that the imager-size is 1/3.2 inch, the image height is 2.9 mm, and a pitch of picture element of the image pickup element is 1.4 µm. However, the imager-size, the image height and the pitch of picture element are not limited by the above-mentioned values. For example, the pitch of picture element may be 2.00 µm or 1.75 µm. Further, the diameter of the aperture stop at the telephoto end position is larger than that at the wide angle end position. Whereby, deterioration of the performance by diffraction limit can be prevented at the telephoto end position. Further, a small and light image pickup apparatus can be realized because the total length of the zoom optical system is fixed and the plastic lens can be used as the lens existing at the object side more than the second lens unit.

Embodiments 1, 2, 3 and 4 using the zoom optical system of the present invention will be described below.

Figure 1B:
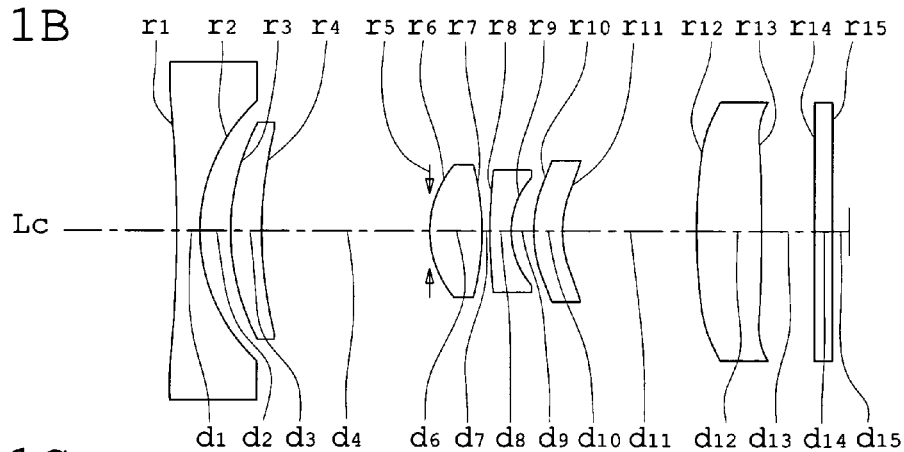
Figure 9A:
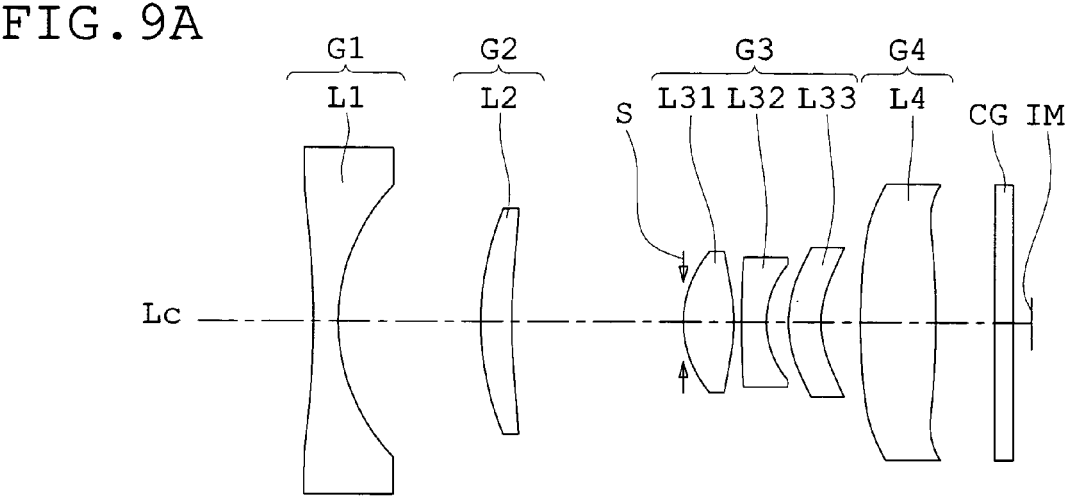
FIGS. 9A, 9B, and 9C show sectional views of a zoom optical system according to the third embodiment of the present invention, taken along the optical axis, and show the conditions in the wide-angle end position, the middle position, and the telephoto end position, respectively.
Figure 9B:
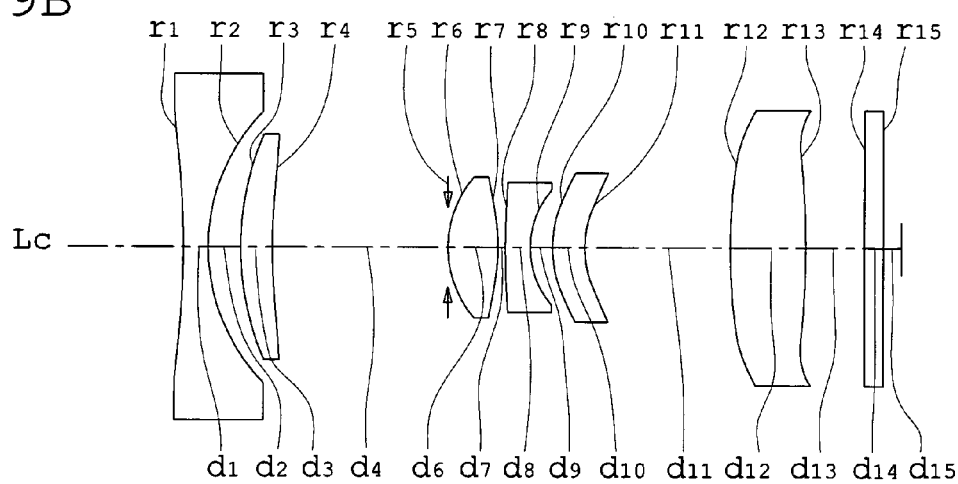
Figure 13A:
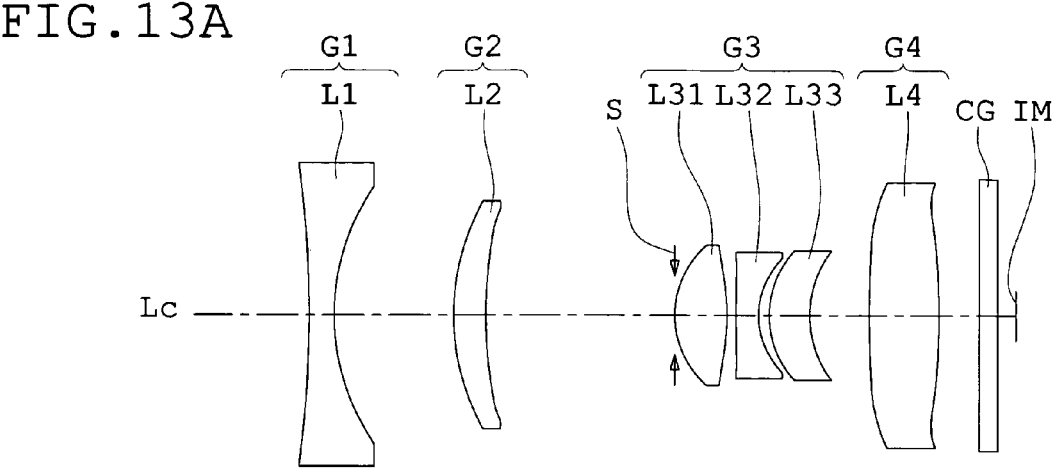
FIGS. 13A, 13B, and 13C show sectional views of a zoom optical system according to the fourth embodiment of the present invention, taken along the optical axis, and show the conditions in the wide-angle end position, the middle position, and the telephoto end position, respectively.
Figure 13B:
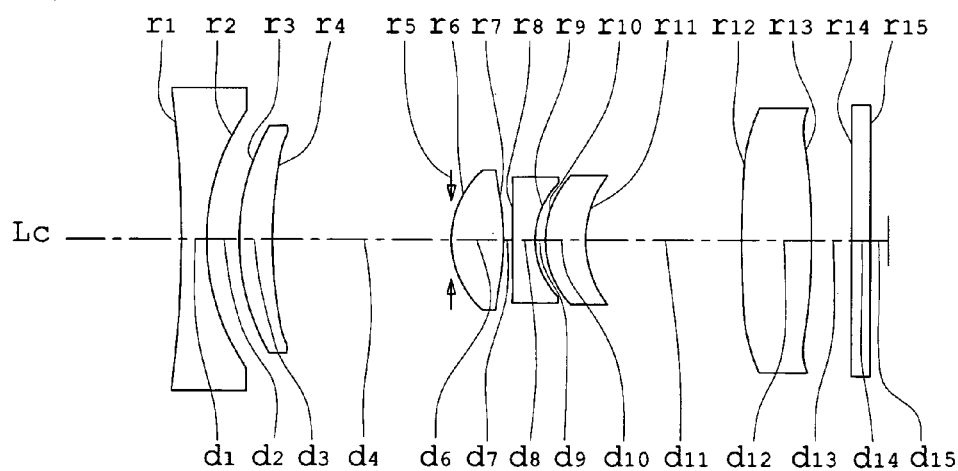

A sectional view of Embodiment 1 of the zoom optical system is shown in FIG. 1, a sectional view of Embodiment 2 of the zoom optical system is shown in FIG. 6, a sectional view of Embodiment 3 of the zoom optical system is shown in FIG. 9, and a sectional view of Embodiment 4 of the zoom optical system is shown in FIG. 13. In these figures, the conditions of the zoom optical system at the wide angle end position, middle position and telephoto end position are shown respectively.

Also, FIG. 2 shows spherical aberration, astigmatism, distortion, and chromatic aberration of magnification in infinite object point focusing of the zoom optical system of Embodiment 1, FIG. 3 shows spherical aberration, astigmatism, distortion, and chromatic aberration of magnification in closest object point focusing of the zoom optical system of Embodiment 1, and FIG. 4 shows coma (at image height ratio=7) of the zoom optical system of Embodiment 1. FIG. 6 shows spherical aberration, astigmatism, distortion, and chromatic aberration of magnification in infinite object point focusing of the zoom optical system of Embodiment 2, FIG. 7 shows spherical aberration, astigmatism, distortion, and chromatic aberration of magnification in closest object point focusing of the zoom optical system of Embodiment 2, and FIG. 8 shows coma (at image height ratio=7) of the zoom optical system of Embodiment 2. FIG. 10 shows spherical aberration, astigmatism, distortion, and chromatic aberration of magnification in infinite object point focusing of the zoom optical system of Embodiment 3, FIG. 11 shows spherical aberration, astigmatism, distortion, and chromatic aberration of magnification in closest object point focusing of the zoom optical system of Embodiment 3, and FIG. 12 shows coma (at image height ratio=7) of the zoom optical system of Embodiment 3, and FIG. 14 shows spherical aberration, astigmatism, distortion, and chromatic aberration of magnification in infinite object point focusing of the zoom optical system of Embodiment 4, FIG. 15 shows spherical aberration, astigmatism, distortion, and chromatic aberration of magnification in closest object point focusing of the zoom optical system of Embodiment 4, and FIG. 16 shows coma (at image height ratio=7) of the zoom optical system of Embodiment 4. In the respective figures, (a) shows the conditions at the wide angle end position, (b) shows the conditions at the middle position, and (c) shows the conditions at telephoto end position, respectively.

Embodiment 1

The optical formation of a zoom optical system of the present embodiment will be explained using FIG. 1. A first lens unit G1 with negative power, a second lens unit G2 with positive power, a third lens unit G3 with positive power, and a fourth lens unit G4 with positive power are arranged on the optical axis Lc in the zoom optical system of the present embodiment in order from the object side. Also, a CCD cover glass CG and a CCD with an imaging plane IM are arranged on the image side of the fourth lens unit G4 in order from the object side.

The first lens unit G1 comprises only a biconcave lens L1.

The second lens unit G2 comprises only a positive meniscus lens L2 the convex surface of which faces toward the object side. In the second lens unit G2, astigmatism and coma are corrected by the positive meniscus lens L2 in wide angle position, and coma is corrected by the positive meniscus lens L2 in telephoto position.

Figure 1C:
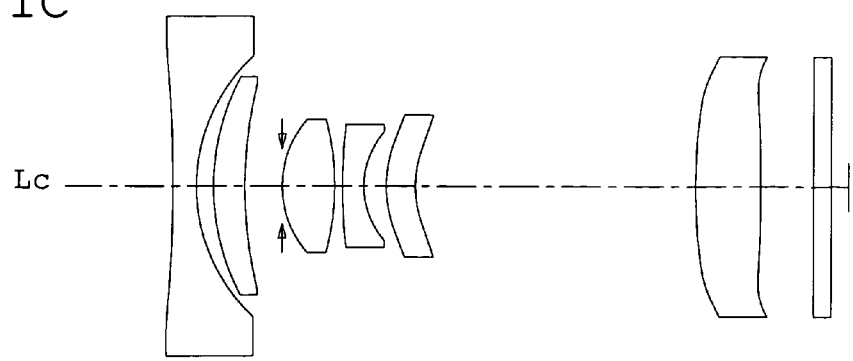
Figure 4A:
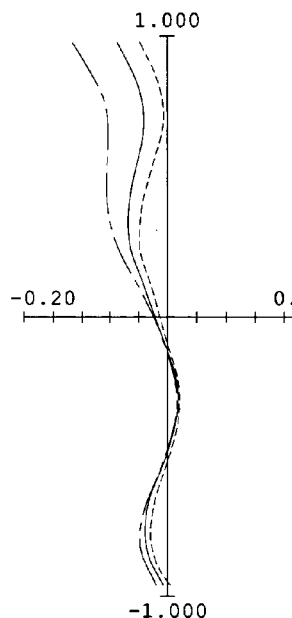
FIGS. 4A-4F are coma diagrams (Image height: 70%).
Figure 4B:
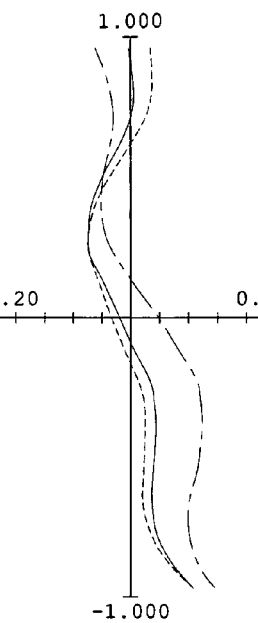
Figure 4C:
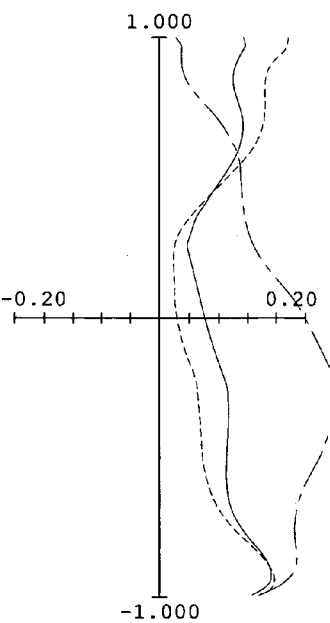
Figure 4D:
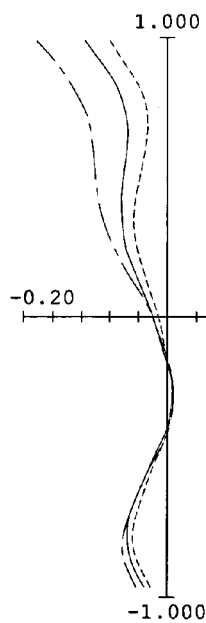
Figure 4E:
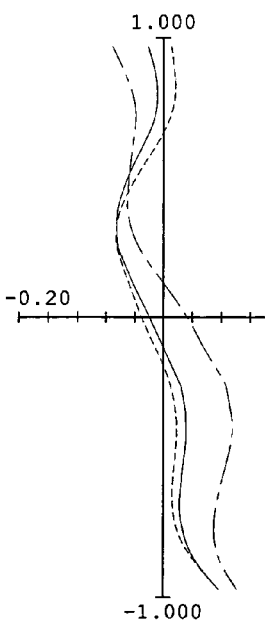
Figure 4F:
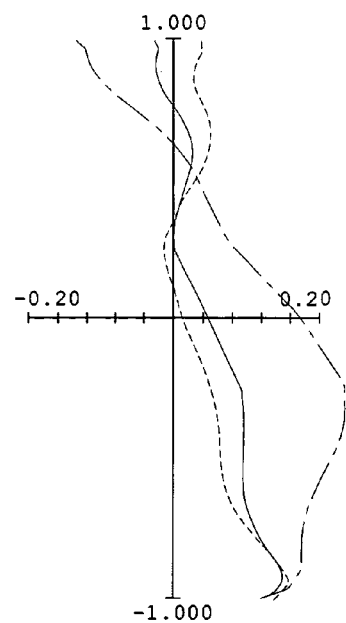

The third lens unit G3 comprises, in order from the object side, an aperture stop S, a biconvex lens L31, a negative meniscus lens L32 the convex surface of which faces toward the object side, and a negative meniscus lens L33 the concave surface of which faces toward the image side. And, as shown in FIGS. 1A and 1C, the aperture stop S is formed in such a way that the aperture diameter of the aperture stop S becomes smaller in wide angle end position than in telephoto end position. In the third lens unit G3, spherical aberration and coma are corrected by the biconvex lens L31 in wide angle position and in telephoto position. In addition, spherical aberration, astigmatism, and coma are corrected by the negative meniscus lens L33 in wide angle position and in telephoto position.

The fourth lens unit G4 comprises only a biconvex lens L4. In the fourth lens unit G4, astigmatism is corrected by the biconvex lens L4 in wide angle position and in telephoto position.

Besides, all of the lenses in the first, second, third and fourth lens units G1-G4 are aspherical lenses.

Also, the first and fourth lens units G1 and G4 do not move in changing a magnification from the wide angle end position to the telephoto end position. In addition, the second and third lens units G2 and G3 moves on the optical axis Lc in such a way that the distance between the first and second lens units G1 and G2 becomes narrow and the distance between the third and fourth lens units G3 and G4 becomes wide. Also, a focusing is carried out by moving the second and third lens units G2 and G3. In this case, the second and third lens units G2 and G3 moves on the optical axis Lc in such a way that the distance between the second lens unit G2 and the third lens unit G3 is changed.

Also, the first to sixth lenses are plastic lenses.

Embodiment 2

Figure 5A:
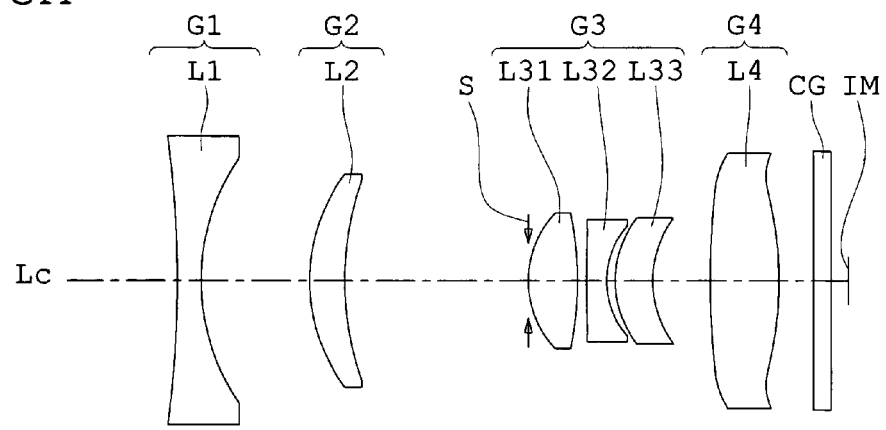
FIGS. 5A, 5B, and 5C show sectional views of a zoom optical system according to the second embodiment of the present invention, taken along the optical axis, and show the conditions in the wide-angle end position, the middle position, and the telephoto end position, respectively.
Figure 5B:
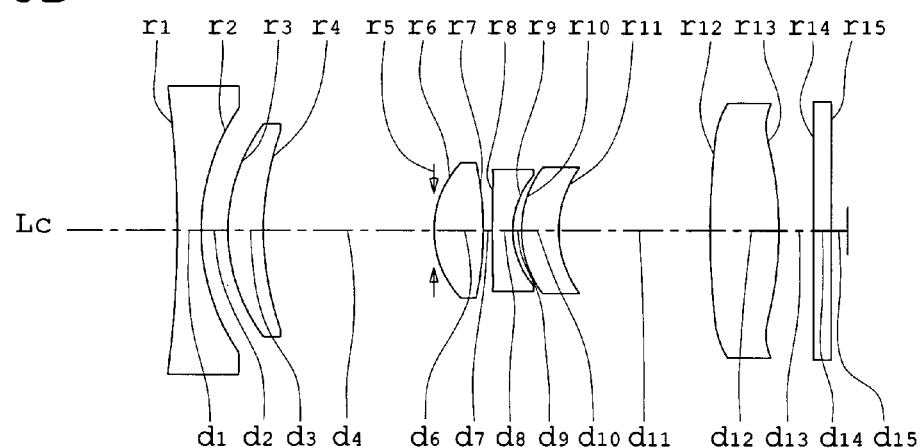

The optical formation of a zoom optical system of the present embodiment will be explained using FIG. 5. A first lens unit G1 with negative power, a second lens unit G2 with positive power, a third lens unit G3 with positive power, and a fourth lens unit G4 with positive power are arranged on the optical axis Lc in the zoom optical system of the present embodiment in order from the object side. Also, a CCD cover glass CG and a CCD with an imaging plane IM are arranged on the image side of the fourth lens unit G4 in order from the object side.

The first lens unit G1 comprises only a biconcave lens L1.

The second lens unit G2 comprises only a positive meniscus lens L2 the convex surface of which faces toward the object side. In the second lens unit G2, astigmatism and coma are corrected by the positive meniscus lens L2 in wide angle position, and coma is corrected by the positive meniscus lens L2 in telephoto position.

Figure 5C:
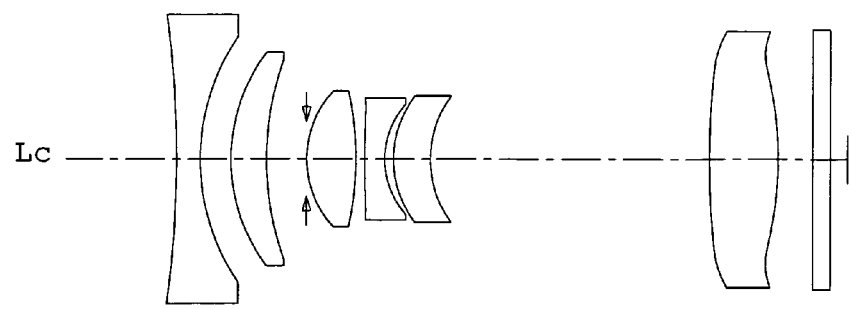
Figure 8A:
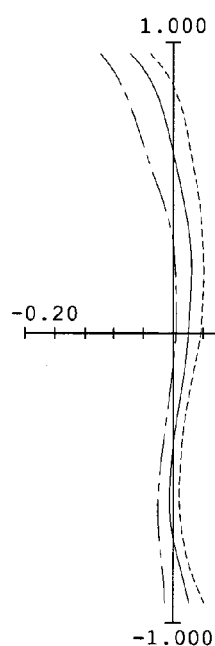
FIGS. 8a-8f are coma diagrams (Image height: 70%).
Figure 8B:
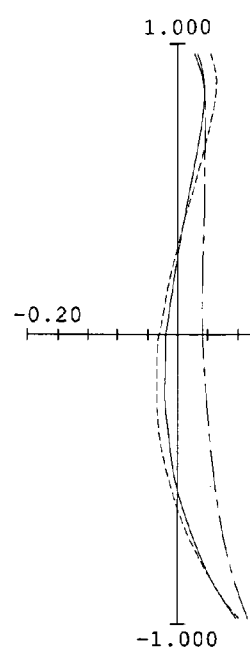
Figure 8C:
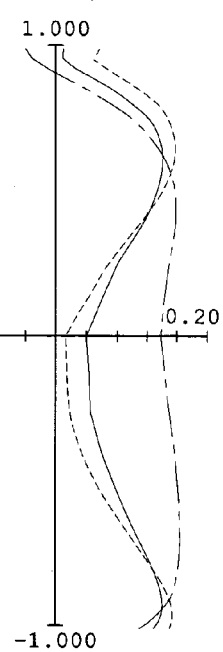
Figure 8D:
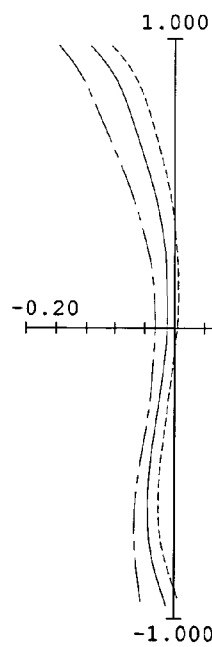
Figure 8E:
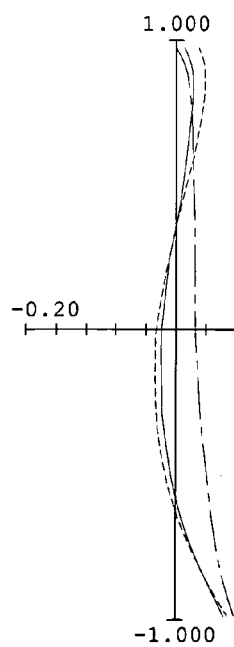
Figure 8F:
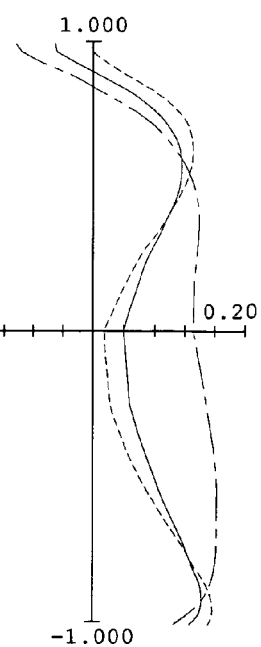

The third lens unit G3 comprises, in order from the object side, an aperture stop S, a biconvex lens L31, a biconcave lens L32, and a negative meniscus lens L33 the concave surface of which faces toward the image side. As shown in FIGS. 5A and 5C, the aperture stop S is formed in such a way that the aperture diameter of the aperture stop S becomes smaller in wide angle end position than in telephoto end position. In the third lens unit G3, spherical aberration and coma are corrected by the biconvex lens L31 in wide angle position and in telephoto position. In addition, astigmatism and coma are corrected by the negative meniscus lens L33 in wide angle position, and spherical aberration and coma are corrected by the negative meniscus lens L33 in telephoto position.

The fourth lens unit G4 comprises only a biconvex lens L4. In the fourth lens unit G4, astigmatism is corrected by the biconvex lens L4 in wide angle position and in telephoto position.

Besides, all of the lenses in the first, second, third and fourth lens units G1-G4 are aspherical lenses.

Also, the first and fourth lens units G1 and G4 do not move in changing a magnification from the wide angle end position to the telephoto end position. In addition, the second and third lens units G2 and G3 moves on the optical axis Lc in such a way that the distance between the first and second lens units G1 and G2 becomes narrow and the distance between the third and fourth lens units G3 and G4 becomes wide. Also, a focusing is carried out by moving the second and third lens units G2 and G3. In this case, the second and third lens units G2 and G3 moves on the optical axis Lc in such a way that the distance between the second lens unit G2 and the third lens unit G3 is changed.

Also, the first lens is a glass lens, and the second to sixth lenses are plastic lenses.

Embodiment 3

The optical formation of a zoom optical system of the present embodiment will be explained using FIG. 9. A first lens unit G1 with negative power, a second lens unit G2 with positive power, a third lens unit G3 with positive power, and a fourth lens unit G4 with positive power are arranged on the optical axis Lc in the zoom optical system of the present embodiment in order from the object side. Also, a CCD cover glass CG and a CCD with an imaging plane IM are arranged on the image side of the fourth lens unit G4 in order from the object side.

The first lens unit G1 comprises only a biconcave lens L1.

The second lens unit G2 comprises only a positive meniscus lens L2 the convex surface of which faces toward the object side. In the second lens unit G2, astigmatism and coma are corrected by the positive meniscus lens L2 in wide angle position, and coma is corrected by the positive meniscus lens L2 in telephoto position.

Figure 9C:
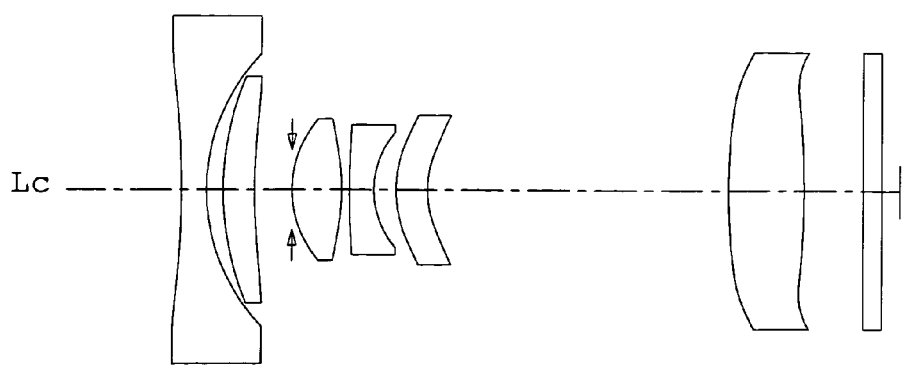
Figure 12A:
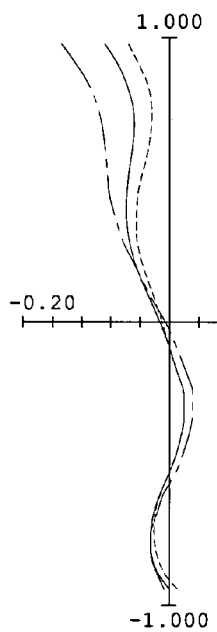
FIGS. 12a-12f are coma diagrams (Image height: 70%) in the third embodiment.
Figure 12B:
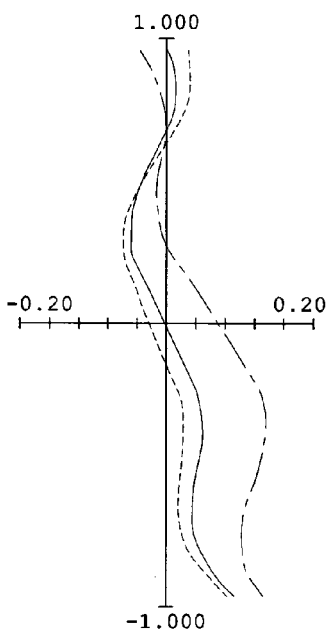
Figure 12C:
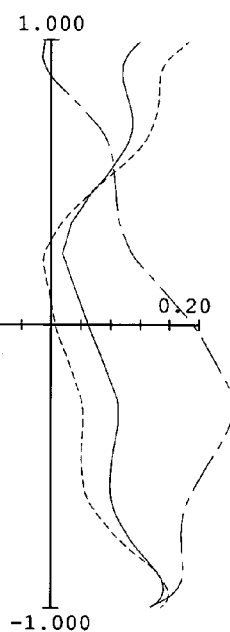
Figure 12D:
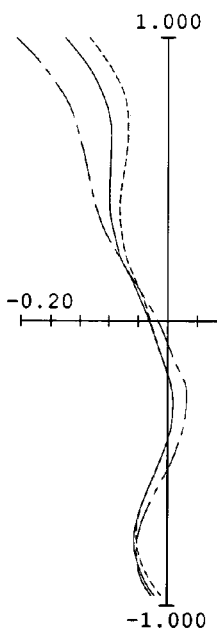
Figure 12E:
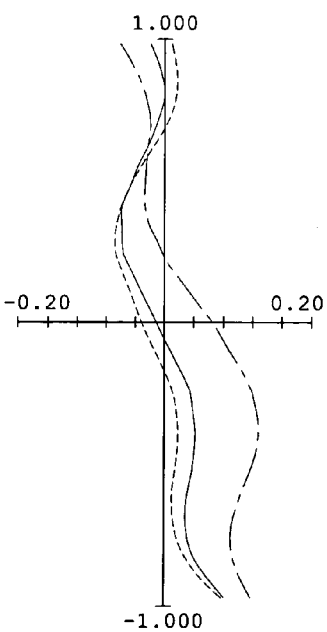
Figure 12F:
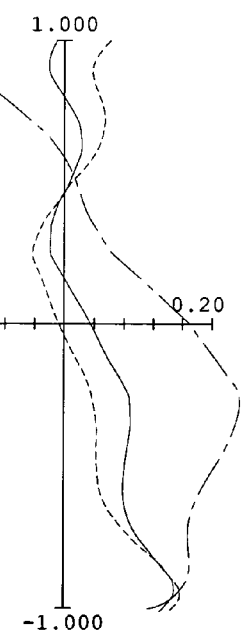

The third lens unit G3 comprises, in order from the object side, an aperture stop S, a biconvex lens L31, a biconcave lens L32, and a positive meniscus lens L33 the concave surface of which faces toward the image side. As shown in FIGS. 9A and 9C, the aperture stop S is formed in such a way that the aperture diameter of the aperture stop S becomes smaller in wide angle end position than in telephoto end position. In the third lens unit G3, spherical aberration and coma are corrected by the biconvex lens L31 in wide angle position and in telephoto position. In addition, spherical aberration, astigmatism, and coma are corrected by the positive meniscus lens L33 in wide angle position and in telephoto position.

The fourth lens unit G4 comprises only a biconvex lens L4. In the fourth lens unit G4, astigmatism is corrected by the biconvex lens L4 in wide angle position and in telephoto position.

Besides, all of the lenses in the first, second, third and fourth lens units G1-G4 are aspherical lenses.

Also, the first and fourth lens units G1 and G4 do not move in changing a magnification from the wide angle end position to the telephoto end position. In addition, the second and third lens units G2 and G3 moves on the optical axis Lc in such a way that the distance between the first and second lens units G1 and G2 becomes narrow and the distance between the third and fourth lens units G3 and G4 becomes wide. Also, a focusing is carried out by moving the second and third lens units G2 and G3. In this case, the second and third lens units G2 and G3 moves on the optical axis Lc in such a way that the distance between the second lens unit G2 and the third lens unit G3 is changed.

Also, the first to sixth lenses are plastic lenses.

Embodiment 4

The optical formation of a zoom optical system of the present embodiment will be explained using FIG. 13. A first lens unit G1 with negative power, a second lens unit G2 with positive power, a third lens unit G3 with positive power, and a fourth lens unit G4 with positive power are arranged on the optical axis Lc in the zoom optical system of the present embodiment in order from the object side. Also, a CCD cover glass CG and a CCD with an imaging plane IM are arranged on the image side of the fourth lens unit G4 in order from the object side.

The first lens unit G1 comprises only a biconcave lens L1.

The second lens unit G2 comprises only a positive meniscus lens L2 the convex surface of which faces toward the object side. In the second lens unit G2, astigmatism and coma are corrected by the positive meniscus lens L2 in wide angle position, and coma is corrected by the positive meniscus lens L2 in telephoto position.

Figure 13C:
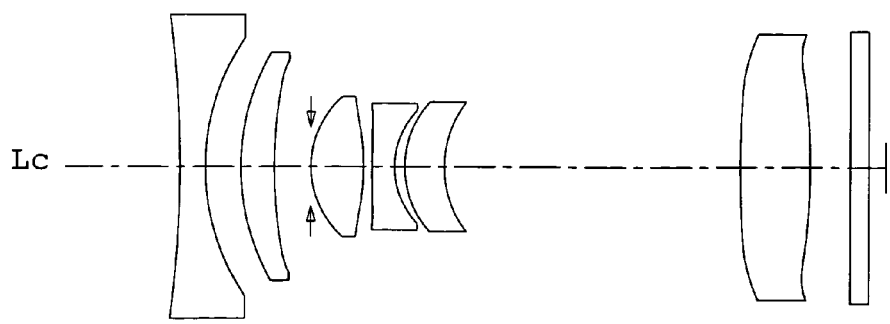
Figure 16A:
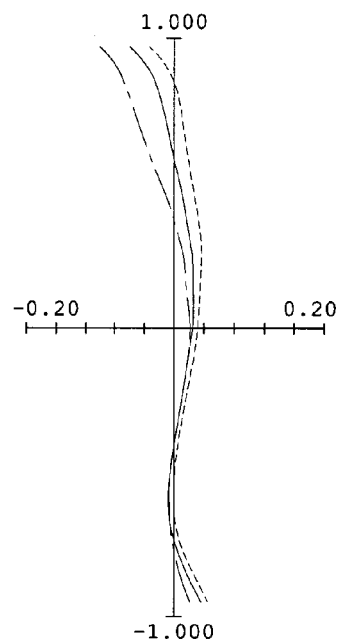
FIGS. 16A-16F are coma diagrams (Image height: 70%) in the fourth embodiment.
Figure 16B:
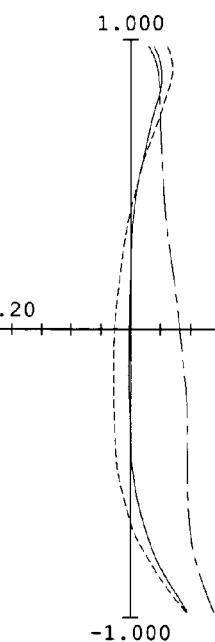
Figure 16C:
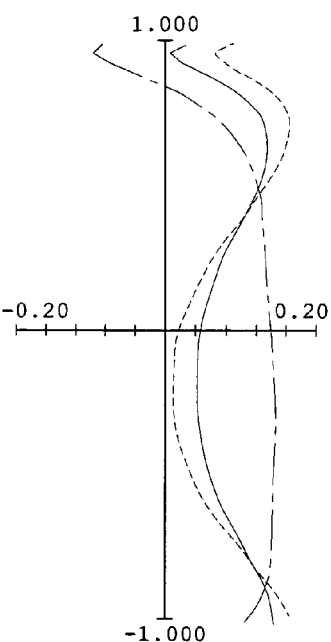
Figure 16D:
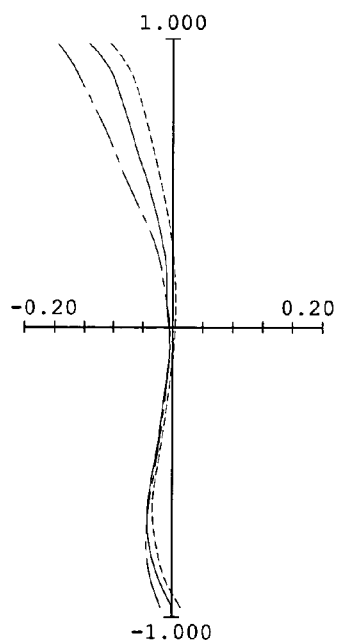
Figure 16E:
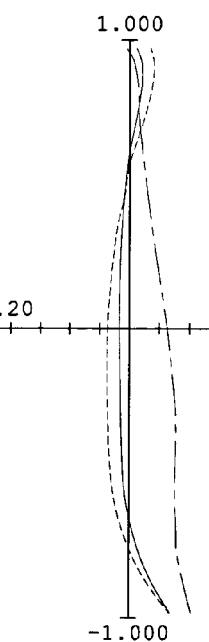
Figure 16F:
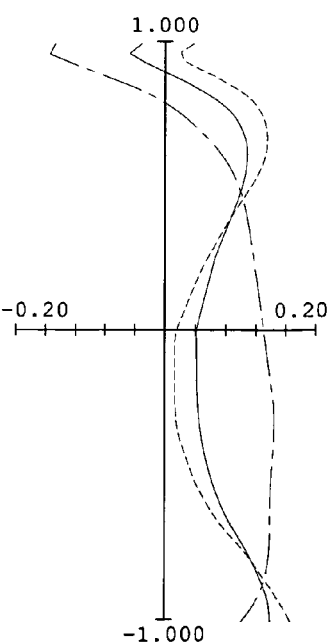

The third lens unit G3 comprises, in order from the object side, an aperture stop S, a biconvex lens L31, a biconcave lens L32, and a negative meniscus lens L33 the concave surface of which faces toward the image side. As shown in FIGS. 13A and 13C, the aperture stop S is formed in such a way that the aperture diameter of the aperture stop S becomes smaller in wide angle end position than in telephoto end position. In the third lens unit G3, spherical aberration and coma are corrected by the biconvex lens L31 in wide angle position and in telephoto position. In addition, astigmatism and coma are corrected by the negative meniscus lens L33 in wide angle position, and spherical aberration and coma are corrected by the negative meniscus lens L33 in telephoto position.

The fourth lens unit G4 comprises only a biconvex lens L4. In the fourth lens unit G4, astigmatism is corrected by the biconvex lens L4 in wide angle position and in telephoto position.

Besides, all of the lenses in the first, second, third and fourth lens units G1-G4 are aspherical lenses.

Also, the first and fourth lens units G1 and G4 do not move in changing a magnification from the wide angle end position to the telephoto end position. In addition, the second and third lens units G2 and G3 moves on the optical axis Lc in such a way that the distance between the first and second lens units G1 and G2 becomes narrow and the distance between the third and fourth lens units G3 and G4 becomes wide. Also, a focusing is carried out by moving the second and third lens units G2 and G3. In this case, the second and third lens units G2 and G3 moves on the optical axis Lc in such a way that the distance between the second lens unit G2 and the third lens unit G3 is changed.

Also, the first lens is a glass lens, and the second to sixth lenses are plastic lenses.

Next, the numerical data on optical members constituting a zoom optical system will be shown with respect to each of Embodiments 1 to 4 according to the present invention. Embodiment 1 corresponds to Numerical Embodiment 1. Embodiment 2 corresponds to Numerical Embodiment 2. Embodiment 3 corresponds to Numerical Embodiment 3. Embodiment 4 corresponds to Numerical Embodiment 4.

Besides, in the numerical data and the drawings, r denotes a radius of curvature of each of lens surfaces, d denotes the thickness of each of lenses or air spacing between lenses, nd denotes the refractive index in the d line (587.56 nm) of each of lenses, vd denotes the Abbe's number in the d line (587.56 nm) of each of lenses, and * (asterisk) denotes an aspherical surface. A unit of length is millimeter (mm).

Also, when z is taken as a coordinate in the direction along the optical axis, y is taken as a coordinate in the direction perpendicular to the optical axis, a conic constant is denoted by K, and aspherical coefficients are denoted by A4, A6, A8, and A10, an aspherical surface shape is expressed by the following equation (I):

$$z=(y^2/r)/[1+\{1-(1+K)(y/r)^2\}^{1/2}]+A4y^4+A6y^6+A8y^8+A10y^{10} \tag{I}$$

Also, E denotes a power of ten. Besides, the signs for these specification values are also common to the numerical data of the embodiments which are described later.

Also, a word, "At infinity" shows the case where a position of an object point is located at infinity, and a word, "At close range" shows the case where a position of an object point is located at close range.

Numerical Embodiment 1
Unit: mm

Surface data

| Surface No. | r | d | nd | vd | Effective radius |
|---|---|---|---|---|---|
| Object plane | ∞ | ∞ | | | |
| 1* | −51.6608 | 0.5500 | 1.53071 | 55.67 | 3.895 |
| 2* | 3.8768 | variable | | | 2.966 |
| 3* | 4.5535 | 0.7634 | 1.63493 | 23.89 | 2.466 |
| 4* | 8.1682 | variable | | | 2.327 |
| 5 (Stop) | INF | 0. | | | variable |
| 6* | 2.2847 | 1.2110 | 1.53071 | 55.67 | 1.238 |

-continued

Numerical Embodiment 1
Unit: mm

| | | | | | |
|---|---|---|---|---|---|
| 7* | −4.8589 | 0.2000 | | | 1.264 |
| 8* | 27.5864 | 0.5000 | 1.63493 | 23.89 | 1.249 |
| 9* | 1.9602 | 0.5251 | | | 1.201 |
| 10* | 1.9235 | 0.7100 | 1.53071 | 55.67 | 1.495 |
| 11* | 1.9019 | variable | | | 1.605 |
| 12* | 13.5849 | 1.5632 | 1.63493 | 23.89 | 1.920 |
| 13* | −23.9264 | 1.2468 | | | 2.216 |
| 14 | INF | 0.4000 | 1.51633 | 64.14 | 2.709 |
| 15 | INF | 0.4000 | | | 2.800 |
| Imaging plane | INF | 0 | | | |

Aspherical surface data
The first surface
$K = 5.0000, A4 = -2.3689E-03, A6 = 2.2861E-04, A8 = -5.0139E-06$
The second surface
$K = -5.0000, A4 = 6.3589E-03, A6 = -6.4385E-04, A8 = 6.1392E-05$
The third surface
$K = -4.9918, A4 = 2.9145E-03, A6 = -7.0503E-04, A8 = 8.6567E-05$
The fourth surface
$K = -1.0842, A4 = -3.5713E-03, A6 = -4.8702E-05, A8 = 6.4636E-05$
The sixth surface
$K = -1.3118, A4 = 5.4455E-03, A6 = 3.1142E-03, A8 = -8.9807E-04$
The seventh surface
$K = -4.1456, A4 = 2.8343E-02, A6 = -1.0009E-02, A8 = 6.3388E-04$
The eighth surface
$K = 0., A4 = 2.5553E-02, A6 = , A8 = -8.5747E-03$
The ninth surface
$K = -3.8315, A4 = 3.2106E-02, A6 = 7.1673E-03, A8 = 7.0864E-04$
The tenth surface
$K = -3.7554, A4 = -1.6713E-02, A6 = -5.6496E-03, A8 = 3.2829E-03$
The eleventh surface
$K = -1.1218, A4 = -4.6813E-02, A6 = 2.8608E-03, A8 = 8.2444E-04$
The twelfth surface
$K = 0.7555, A4 = -3.5888E-03, A6 = 7.7270E-04, A8 = -1.4117E-05$
The thirteenth surface
$K = -5.0000, A4 = -5.3330E-03, A6 = 7.1434E-04, A8 = 2.8583E-05$

Various data
Zoom ratio 2.86

| | At infinity | | | At close range | | |
|---|---|---|---|---|---|---|
| | Wide angle position | Middle position | Telephoto position | Wide angle position | Middle position | Telephoto position |
| Focal length | 4.1560 | 6.6926 | 11.8930 | | | |
| F number | 3.2000 | 4.3955 | 5.2000 | | | |
| 2ω (°) | 76.8314 | 47.3319 | 26.6136 | | | |
| Image height | 2.9000 | 2.9000 | 2.9000 | | | |
| BF | 1.9106 | 1.9106 | 1.9106 | 1.9106 | 1.9106 | 1.9106 |
| The total length of lens | 15.8638 | 15.8638 | 15.8638 | 15.8638 | 15.8638 | 15.8638 |
| Distance from object point | INF | INF | INF | 100.00 | 500.00 | 800.00 |
| d2 | 3.20167 | 0.70340 | 0.32689 | 2.87472 | 0.77396 | 0.40131 |
| d4 | 3.81998 | 3.97973 | 0.90921 | 3.67470 | 3.82390 | 0.78692 |
| d11 | 0.90833 | 3.24735 | 6.69438 | 1.38106 | 3.33261 | 6.74225 |
| Effective radius of the fifth surface | 1.07986 | 1.07986 | 1.29223 | | | |
| Entrance pupil position | 4.3270 | 3.9117 | 1.8554 | | | |
| Exit pupil position | −4.2704 | −9.0113 | −23.7801 | | | |

Single lens data

| Lens | Object side surface | Focal length |
|---|---|---|
| 1 | 1 | −6.7717 |
| 2 | 3 | 14.9773 |
| 3 | 6 | 3.1110 |
| 4 | 8 | −3.3488 |
| 5 | 10 | 30.6882 |
| 6 | 12 | 13.8717 |

Numerical Embodiment 1
Unit: mm

Zoom lens unit data

| Unit | The most object side surface | Focal length | Lens forming length | Front principal point position | Rear principal point position |
|---|---|---|---|---|---|
| 1 | 1 | −6.77173 | 0.55000 | 0.33309 | −0.02500 |
| 2 | 3 | 14.97729 | 0.76341 | −0.54362 | −0.97516 |
| 3 | 5 | 6.08549 | 3.14612 | −2.43254 | −3.36708 |
| 4 | 12 | 13.87175 | 1.56316 | 0.35195 | −0.61988 |

| Unit | The most object side surface | Wide-angle position | Middle position | Telephoto position |
|---|---|---|---|---|
| (magnification: at infinity) | | | | |
| 1 | 1 | 0. | 0. | 0. |
| 2 | 3 | 2.71205 | 1.86731 | 1.78359 |
| 3 | 5 | −0.27764 | −0.64555 | −1.19269 |
| 4 | 12 | 0.81508 | 0.81988 | 0.82560 |
| (magnification: at close range) | | | | |
| 1 | 1 | 0.06323 | 0.01335 | 0.00839 |
| 2 | 3 | 2.38583 | 1.86270 | 1.78733 |
| 3 | 5 | −0.36035 | −0.66133 | −1.20836 |
| 4 | 12 | 0.81359 | 0.81935 | 0.82328 |

Numerical Embodiment 2
Unit: mm

Surface data

| Surface No. | r | d | nd | vd | Effective radius |
|---|---|---|---|---|---|
| Object plane | ∞ | ∞ | | | |
| 1* | −55.6233 | 0.5500 | 1.74320 | 49.34 | 3.346 |
| 2* | 4.3538 | variable | | | 2.812 |
| 3* | 4.7889 | 0.8271 | 1.63493 | 23.89 | 2.493 |
| 4* | 10.0506 | variable | | | 2.337 |
| 5 (Stop) | INF | 0 | | | variable |
| 6* | 2.1627 | 1.2014 | 1.53071 | 55.67 | 1.258 |
| 7* | −4.5237 | 0.2000 | | | 1.248 |
| 8* | −22.7535 | 0.5000 | 1.63493 | 23.89 | 1.218 |
| 9* | 2.6428 | 0.2018 | | | 1.161 |
| 10* | 2.2752 | 0.8843 | 1.53071 | 55.67 | 1.355 |
| 11* | 1.8986 | variable | | | 1.402 |
| 12* | 43.0787 | 1.5853 | 1.63493 | 23.89 | 1.923 |
| 13* | −8.6832 | 0.8454 | | | 2.258 |
| 14 | INF | 0.4000 | 1.51633 | 64.14 | 2.669 |
| 15 | INF | 0.4000 | | | 2.790 |
| Imaging plane | INF | 0 | | | |

Aspherical surface data
The first surface
K = −5.0000, A4 = −3.5050E−04, A6 = −2.9877E−05, A8 = 1.2697E−06
The second surface
K = −2.2356, A4 = 2.3132E−03, A6 = −1.3396E−04, A8 = 3.2976E−06
The third surface
K = −5.0000, A4 = 3.9494E−03, A6 = −7.5246E−04, A8 = 1.2324E−04
The fourth surface
K = −5.0000, A4 = −6.9865E−04, A6 = −3.5969E−04, A8 = 1.3333E−04
The sixth surface
K = −0.9253, A4 = 7.7157E−03, A6 = 1.4966E−03, A8 = 3.6960E−04
The seventh surface
K = −3.8330, A4 = 3.2496E−02, A6 = −7.6552E−03, A8 = 3.3221E−04
The eighth surface
K = 5.0000, A4 = 5.2474E−02, A6 = −1.4640E−02, A8 = −1.7927E−03
The ninth surface
K = −1.1017, A4 = 5.8179E−02, A6 = 1.0094E−02, A8 = −3.1682E−03
The tenth surface
K = −1.1413, A4 = −2.8077E−03, A6 = 7.8721E−03, A8 = −7.6138E−04
The eleventh surface
K = −3.0502, A4 = 2.4355E−02, A6 = −1.0338E−02, A8 = 2.0293E−03

-continued

Numerical Embodiment 2
Unit: mm

The twelfth surface
K = −5.0000, A4 = −3.0138E−03, A6 = 8.8735E−04, A8 = −2.0557E−05
The thirteenth surface
K = 2.9075, A4 = −2.3112E−03, A6 = 6.1173E−04, A8 = 3.0823E−05

Various data
Zoom ratio 2.85

| | At infinity | | | At close range | | |
| --- | --- | --- | --- | --- | --- | --- |
| | Wide angle position | Middle position | Telephoto position | Wide angle position | Middle position | Telephoto position |
| Focal length | 3.7540 | 6.0422 | 10.6990 | | | |
| F number | 3.2000 | 4.4451 | 5.2000 | | | |
| 2ω (°) | 82.4647 | 50.6044 | 29.4677 | | | |
| Image height | 2.9000 | 2.9000 | 2.9000 | | | |
| BF | 1.5092 | 1.5092 | 1.5092 | 1.5092 | 1.5092 | 1.5092 |
| The total length of lens | 15.8638 | 15.8638 | 15.8638 | 15.8638 | 15.8638 | 15.8638 |
| Distance from object point | INF | INF | INF | 100.00 | 500.00 | 800.00 |
| d2 | 2.65840 | 0.72395 | 0.75945 | 2.55121 | 0.81151 | 0.78981 |
| d4 | 4.35777 | 4.06276 | 0.90750 | 4.19356 | 3.97755 | 0.8952 |
| d11 | 1.38855 | 3.61801 | 6.73777 | 1.65994 | 3.61566 | 6.71964 |
| Effective radius of the fifth surface | 1.08274 | 1.08274 | 1.30276 | | | |
| Entrance pupil position | 3.9029 | 3.5454 | 1.9769 | | | |
| Exit pupil position | −5.3916 | −11.9485 | −40.1914 | | | |

Single lens data

| Lens | Object side surface | Focal length |
| --- | --- | --- |
| 1 | 1 | −5.4118 |
| 2 | 3 | 13.5781 |
| 3 | 6 | 2.9402 |
| 4 | 8 | −3.7009 |
| 5 | 10 | −116.2648 |
| 6 | 12 | 11.5187 |

Zoom lens unit data

| Unit | The most object side surface | Focal length | Lens forming length | Front principal point position | Rear principal point position |
| --- | --- | --- | --- | --- | --- |
| 1 | 1 | −5.41177 | 0.55000 | 0.29147 | −0.02281 |
| 2 | 3 | 13.57813 | 0.82710 | −0.43394 | −0.91073 |
| 3 | 5 | 5.35403 | 2.98750 | −2.39984 | −3.04727 |
| 4 | 12 | 11.51870 | 1.58532 | 0.81670 | −0.16462 |

| Unit | The most object side surface | Wide-angle position | Middle position | Telephoto position |
| --- | --- | --- | --- | --- |
| (magnification: at infinity) | | | | |
| 1 | 1 | 0. | 0. | 0. |
| 2 | 3 | 2.29396 | 1.72892 | 1.73677 |
| 3 | 5 | −0.35494 | −0.75229 | −1.31603 |
| 4 | 12 | 0.85194 | 0.85842 | 0.86496 |
| (magnification: at close range) | | | | |
| 1 | 1 | 0.05120 | 0.01070 | 0.00672 |
| 2 | 3 | 2.15411 | 1.73547 | 1.73544 |
| 3 | 5 | −0.41118 | −0.75190 | −1.32590 |
| 4 | 12 | 0.85007 | 0.85840 | 0.86037 |

Numerical Embodiment 3
Unit: mm

Surface data

| Surface No. | r | d | nd | vd | Effective radius |
|---|---|---|---|---|---|
| Object plane | ∞ | ∞ | | | |
| 1* | −38.0236 | 0.5500 | 1.53071 | 55.67 | 3.808 |
| 2* | 3.9998 | variable | | | 2.917 |
| 3* | 4.8458 | 0.7035 | 1.62980 | 19.20 | 2.426 |
| 4* | 9.0700 | variable | | | 2.326 |
| 5 (Stop) | INF | 0. | | | variable |
| 6* | 2.2785 | 1.1232 | 1.53071 | 55.67 | 1.254 |
| 7* | −3.8539 | 0.2000 | | | 1.270 |
| 8* | −40.0984 | 0.5000 | 1.63493 | 23.89 | 1.250 |
| 9* | 1.9748 | 0.5045 | | | 1.200 |
| 10* | 1.9109 | 0.7326 | 1.53071 | 55.67 | 1.531 |
| 11* | 1.9364 | variable | | | 1.595 |
| 12* | 13.7972 | 1.6493 | 1.62980 | 19.20 | 1.873 |
| 13* | −23.7269 | 1.2951 | | | 2.196 |
| 14 | INF | 0.4000 | 1.51633 | 64.14 | 2.702 |
| 15 | INF | 0.4000 | | | 2.793 |
| Imaging plane | INF | 0 | | | |

Aspherical surface data

The first surface
K = −5.0000, A4 = −2.1852E−03, A6 = 2.3439E−04, A8 = −5.5433E−06
The second surface
K = −5.0000, A4 = 5.7565E−03, A6 = −5.4319E−04, A8 = 5.9249E−05
The third surface
K = −5.0000, A4 = 1.5667E−03, A6 = −6.4760E−04, A8 = 5.4964E−05
The fourth surface
K = −0.8915, A4 = −3.8.27E−03, A6 = −1.3366E−04, A8 = 3.3492E−05
The sixth surface
K = −1.3272, A4 = 5.4101E−03, A6 = 3.2685E−03, A8 = −6.5704E−04
The seventh surface
K = −5.0000, A4 = 3.1361E−02, A6 = −9.0904E−03, A8 = 5.7692E−04
The eighth surface
K = 0., A4 = 3.4385E−02, A6 = −9.4730E−03
The ninth surface
K = −3.1230, A4 = 2.8262E−02, A6 = 8.0776E−03, A8 = 2.0204E−04
The tenth surface
K = −3.0412, A4 = −6.2185E−03, A6 = −4.7941E−03, A8 = 2.3615E−03
The eleventh surface
K = −0.6303, A4 = −3.4934E−02, A6 = −2.5407E−03, A8 = 1.4259E−03
The twelfth surface
K = −4.3948, A4 = −3.7884E−03, A6 = 8.6086E−04, A8 = −2.0006E−05
The thirteenth surface
K = 3.0386, A4 = −5.2471E−03, A6 = 6.6913E−04, A8 = 3.1589E−05

Various data
Zoom ratio 2.85

| | At infinity | | | At close range | | |
|---|---|---|---|---|---|---|
| | Wide angle position | Middle position | Telephoto position | Wide angle position | Middle position | Telephoto position |
| Focal length | 4.1560 | 6.6825 | 11.8444 | | | |
| F number | 3.2000 | 4.3748 | 5.2000 | | | |
| 2ω (°) | 76.8112 | 47.2896 | 26.7177 | | | |
| Image height | 2.9000 | 2.9000 | 2.9000 | | | |
| BF | 1.9589 | 1.9589 | 1.9589 | 1.9589 | 1.9589 | 1.9589 |
| The total length of lens | 15.8638 | 15.8638 | 15.8638 | 15.8638 | 15.8638 | 15.8638 |
| Distance from object point | INF | INF | INF | 100.00 | 500.00 | 800.00 |
| d2 | 3.20364 | 0.71094 | 0.35418 | 2.85220 | 0.77962 | 0.42575 |
| d4 | 3.82153 | 3.96294 | 0.87502 | 3.67443 | 3.82570 | 0.78309 |
| d11 | 0.91647 | 3.26777 | 6.71244 | 1.41502 | 3.33632 | 6.73280 |
| Effective radius of the fifth surface | 1.09169 | 1.09169 | 1.29647 | | | |
| Entrance pupil position | 4.2826 | 3.8411 | 1.8021 | | | |
| Exit pupil position | −4.2872 | −8.9973 | −23.2967 | | | |
| Front principal point position | 5.3892 | 6.4323 | 8.0684 | | | |

-continued

Numerical Embodiment 3
Unit: mm

| | | | | |
|---|---|---|---|---|
| Rear principal point position | −3.7199 | −6.3237 | −11.5497 | |

Single lens data

| Lens | Object side surface | Focal length |
|---|---|---|
| 1 | 1 | −6.7887 |
| 2 | 3 | 15.5218 |
| 3 | 6 | 2.8811 |
| 4 | 8 | −2.9507 |
| 5 | 10 | 24.9513 |
| 6 | 12 | 14.0915 |

Zoom lens unit data

| Unit | The most object side surface | Focal length | Lens forming length | Front principal point position | Rear principal point position |
|---|---|---|---|---|---|
| 1 | 1 | −6.78866 | 0.55000 | 0.32364 | −0.03405 |
| 2 | 3 | 15.52177 | 0.70352 | −0.46524 | −0.87080 |
| 3 | 5 | 6.10355 | 3.06039 | −2.39906 | −3.31755 |
| 4 | 12 | 14.09153 | 1.64934 | 0.37853 | −0.65095 |

| Unit | The most object side surface | Wide-angle position | Middle position | Telephoto position |
|---|---|---|---|---|
| (magnification: at infinity) | | | | |
| 1 | 1 | 0. | 0. | 0. |
| 2 | 3 | 2.60403 | 1.83616 | 1.76181 |
| 3 | 5 | −0.28944 | −0.65560 | −1.20436 |
| 4 | 12 | 0.81223 | 0.81772 | 0.82227 |
| (magnification: at close range) | | | | |
| 1 | 1 | 0.06338 | 0.01339 | 0.00841 |
| 2 | 3 | 2.30213 | 1.83136 | 1.76471 |
| 3 | 5 | −0.37551 | −0.67087 | −1.21562 |
| 4 | 12 | 0.81098 | 0.81655 | 0.81995 |

Numerical Embodiment 4
Unit: mm

Surface data

| Surface No. | r | d | nd | vd | Effective radius |
|---|---|---|---|---|---|
| Object plane | ∞ | ∞ | | | |
| 1* | −39.6101 | 0.5500 | 1.74320 | 49.34 | 3.397 |
| 2* | 4.5728 | variable | | | 2.835 |
| 3* | 4.9091 | 0.7619 | 1.62980 | 19.20 | 2.478 |
| 4* | 10.0889 | variable | | | 2.333 |
| 5 (Stop) | INF | 0. | | variable | |
| 6* | 2.1873 | 1.1902 | 1.53071 | 55.67 | 1.265 |
| 7* | −3.7832 | 0.2000 | | | 1.259 |
| 8* | −11.1657 | 0.5000 | 1.63493 | 23.89 | 1.227 |
| 9* | 2.6071 | 0.2000 | | | 1.170 |
| 10* | 2.1724 | 0.8988 | 1.53071 | 55.67 | 1.373 |
| 11* | 1.9094 | variable | | | 1.400 |
| 12* | 26.1549 | 1.6156 | 1.62980 | 19.20 | 1.924 |
| 13* | −10.6782 | 0.8768 | | | 2.265 |
| 14 | INF | 0.4000 | 1.51633 | 64.14 | 2.672 |
| 15 | INF | 0.4000 | | | 2.792 |
| Imaging plane | INF | 0 | | | |

Aspherical surface data

The first surface
K = 5.0000, A4 = 3.4975E−05, A6 = −2.3811E−05, A8 = 8.2658E−07
The second surface
K = −2.6439, A4 = 2.7465E−03, A6 = −9.1294E−05, A8 = 9.0311E−07
The third surface
K = −5.0000, A4 = 3.4545E−03, A6 = −8.4642E−04, A8 = 1.4317E−04

-continued

Numerical Embodiment 4
Unit: mm

The fourth surface
K = −3.4334, A4 = −8.7302E−04, A6 = −5.1292E−04, A8 = 1.6361E−04
The sixth surface
K = −0.9847, A4 = 7.0798E−03, A6 = 1.1301E−03, A8 = 5.5780E−04
The seventh surface
K = −3.3601, A4 = 3.3391E−02, A6 = −6.8196E−03, A8 = 3.6382E−04
The eighth surface
K = −5.0000, A4 = 5.5362E−02, A6 = −1.3383E−02, A8 = −1.7622E−03
The ninth surface
K = −1.5074, A4 = 5.5295E−02, A6 = 1.2251E−02, A8 = −4.2562E−03
The tenth surface
K = −1.2769, A4 = −4.2206E−03, A6 = 9.8202E−03, A8 = −1.2616E−03
The eleventh surface
K = −2.5874, A4 = 1.7247E−02, A6 = −6.5249E−03, A8 = 1.7292E−03
The twelfth surface
K = −4.9984, A4 = −3.3826E−03, A6 = 8.6972E−04, A8 = −2.0514E−05
The thirteenth surface
K = 4.6501, A4 = −2.9346E−03, A6 = 5.7926E−04, A8 = 2.9937E−05

Various data
Zoom ratio 2.85

| | At infinity | | | At close range | | |
| --- | --- | --- | --- | --- | --- | --- |
| | Wide angle position | Middle position | Telephoto position | Wide angle position | Middle position | Telephoto position |
| Focal length | 3.7540 | 6.0206 | 10.6988 | | | |
| F number | 3.2000 | 4.4160 | 5.2000 | | | |
| 2ω (°) | 82.4751 | 51.0721 | 29.4685 | | | |
| Image height | 2.9000 | 2.9000 | 2.9000 | | | |
| BF | 1.5406 | 1.5406 | 1.5406 | 1.5406 | 1.5406 | 1.5406 |
| The total length of lens | 15.8638 | 15.8638 | 15.8638 | 15.8638 | 15.8638 | 15.8638 |
| Distance from object point | INF | INF | INF | 100.00 | 500.00 | 800.00 |
| d2 | 2.66967 | 0.70000 | 0.78255 | 2.50868 | 0.80310 | 0.81221 |
| d4 | 4.35910 | 4.10576 | 0.87677 | 4.20075 | 3.98565 | 0.88844 |
| d11 | 1.37792 | 3.60092 | 6.74737 | 1.69726 | 3.61793 | 6.70604 |
| Effective radius of the fifth surface | 1.09123 | 1.09123 | 1.30441 | | | |
| Entrance pupil position | 3.8832 | 3.5204 | 1.9381 | | | |
| Exit pupil position | −5.1717 | −10.9977 | −32.3111 | | | |
| Front principal point position | 5.5468 | 6.6382 | 9.2452 | | | |
| Rear principal point position | −3.3249 | −5.6715 | −10.4032 | | | |

Single lens data

| Lens | Object side surface | Focal length |
| --- | --- | --- |
| 1 | 1 | −5.4870 |
| 2 | 3 | 14.3658 |
| 3 | 6 | 2.8055 |
| 4 | 8 | −3.2826 |
| 5 | 10 | 160.6241 |
| 6 | 12 | 12.2471 |

Zoom lens unit data

| Unit | The most object side surface | Focal length | Lens forming length | Front principal point position | Rear principal point position |
| --- | --- | --- | --- | --- | --- |
| 1 | 1 | −5.48698 | 0.55000 | 0.28136 | −0.03248 |
| 2 | 3 | 14.36576 | 0.76185 | −0.41920 | −0.86152 |
| 3 | 5 | 5.34569 | 2.98906 | −2.36754 | −3.03610 |
| 4 | 12 | 12.24709 | 1.61558 | 0.71603 | −0.29233 |
| | | INF | 0.80000 | 0. | −0.66379 |

| Unit | The most object side surface | Wide-angle position | Middle position | Telephoto position |
| --- | --- | --- | --- | --- |
| (magnification: at infinity) | | | | |
| 1 | 1 | 0. | 0. | 0. |
| 2 | 3 | 2.17800 | 1.67716 | 1.69349 |

-continued

Numerical Embodiment 4
Unit: mm

| 3 | 5  | −0.37045              | −0.76563 | −1.34061 |
| 4 | 12 | 0.84796               | 0.85449  | 0.85886  |
|   |    | (magnification: at close range) |          |          |
| 1 | 1  | 0.05188               | 0.01085  | 0.00681  |
| 2 | 3  | 2.04016               | 1.68574  | 1.69195  |
| 3 | 5  | −0.43490              | −0.76530 | −1.34411 |
| 4 | 12 | 0.84648               | 0.85562  | 0.85526  |

Next, the values which Embodiment 1 (Numerical Embodiment 1), Embodiment 2 (Numerical Embodiment 2), Embodiment 3 (Numerical Embodiment 3), and Embodiment 4 (Numerical Embodiment 4) have in the above conditions (1) to (7) will be shown.

The values which the embodiments have in each of the conditions

|                      | Embodiment 1, | Embodiment 2, | Embodiment 3, | Embodiment 4 |
|----------------------|---------------|---------------|---------------|--------------|
| Condition (1) (HF3g/fw) | −0.59       | −0.64         | −0.58         | −0.63        |
| Condition (2) (SD3g/fw) | 0.76        | 0.80          | 0.74          | 0.80         |
| Condition (3) (ndeo)   | 1.6349      | 1.6349        | 1.6349        | 1.6349       |
| Condition (4) (vdeo)   | 23.9        | 23.9          | 23.9          | 23.9         |
| Condition (5) (L2)     | 1.6349      | 1.6349        | 1.6298        | 1.6298       |
| Condition (5) (L31)    | 1.5307      | 1.5307        | 1.5307        | 1.5307       |
| Condition (5) (L32)    | 1.6349      | 1.6349        | 1.6349        | 1.6349       |
| Condition (5) (L33)    | 1.5307      | 1.5307        | 1.5307        | 1.5307       |
| Condition (5) (L4)     | 1.6349      | 1.6349        | 1.6298        | 1.6298       |
| Condition (6) (fw/f3g) | 0.7         | 0.7           | 0.7           | 0.7          |
| Condition (7) (f3g/R4gl) | 0.4       | 0.1           | 0.4           | 0.2          |

As described above, a zoom optical system according to the present invention can be used for an imaging apparatus in which imaging is carried out by forming on an image pick-up element such as CCD an object image formed by the zoom optical system, and, for example, a zoom optical system according to the present invention can be used for a digital camera or a video camera. A concrete example of the imaging apparatus will be shown below.

Figure 17:
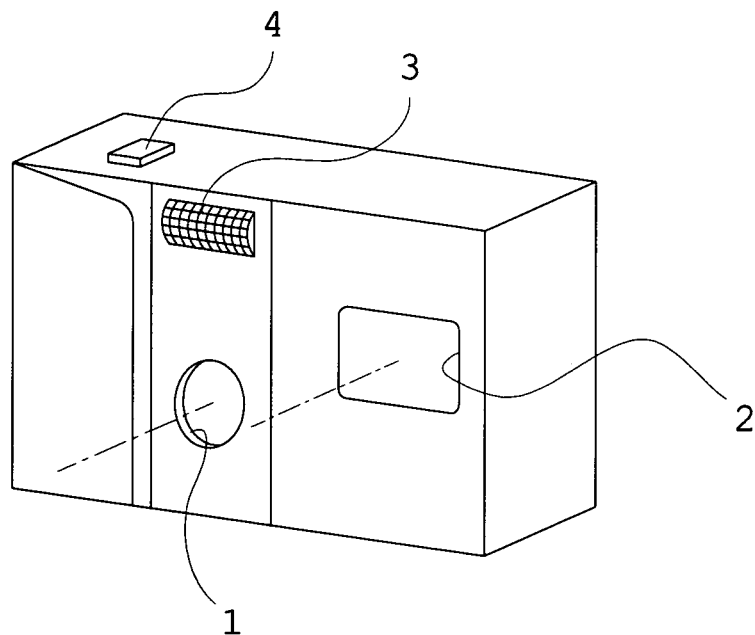
FIG. 17 is a front perspective view showing the appearance of a digital camera incorporating the zoom optical system of the present invention.
Figure 18:
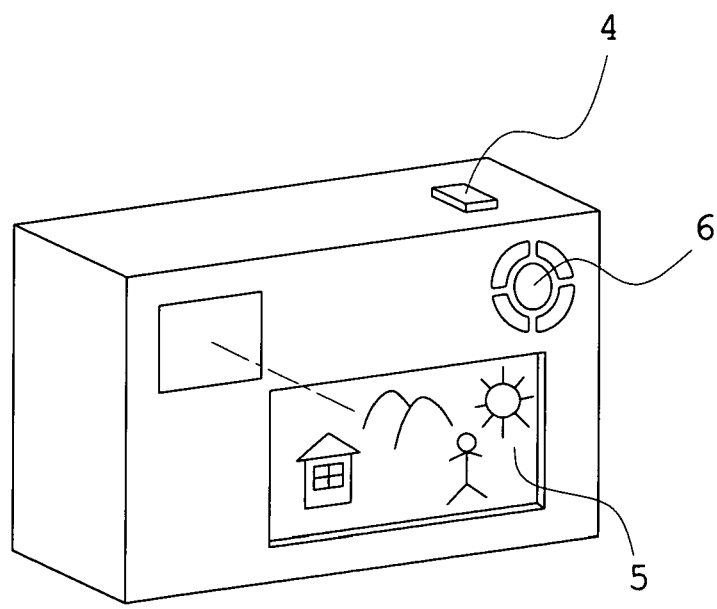
FIG. 18 is a back perspective view showing the appearance of the digital camera shown in FIG. 17.
Figure 19:
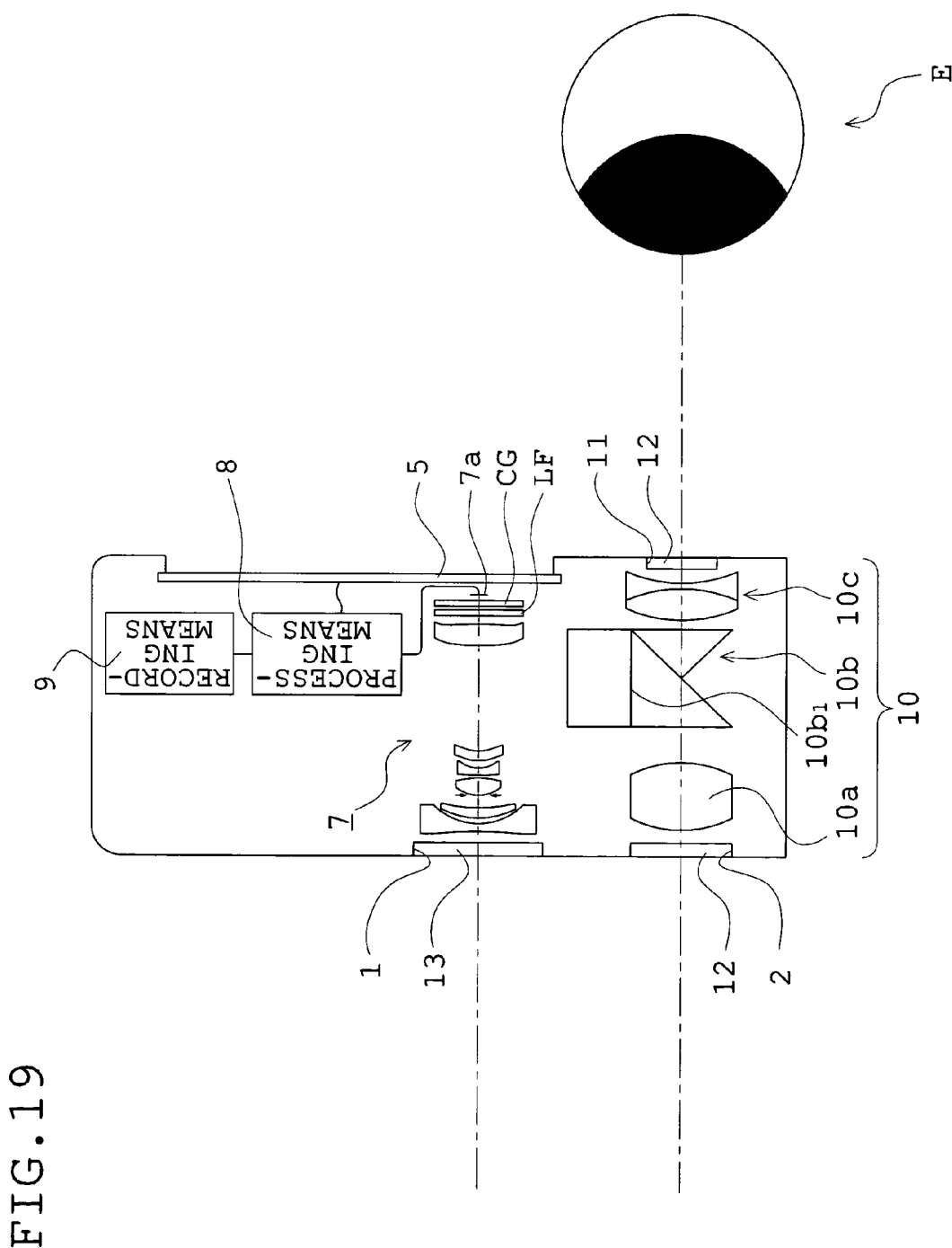
FIG. 19 is a perspective plan view showing schematically the structure of the digital camera shown in FIG. 18.

FIGS. 17, 18, and 19 are conceptual views which show the formation of a digital camera using the present invention. FIG. 17 is a front perspective view showing the appearance of the digital camera. FIG. 18 is a back perspective view showing the appearance of the digital camera shown in FIG. 17. FIG. 19 is a perspective plan view showing schematically the structure of the digital camera shown in FIG. 18.

The digital camera is provided with a shooting opening 1, a finder opening 2, and a flash light emitting section 3 on the front side thereof. Also, the digital camera is provided with a shutter button 4 on the upper portion thereof. Also, the digital camera is provided with a liquid crystal display monitor 5 and an information inputting section 6 on the back side thereof. Also, the digital camera is provided with a zoom optical system 7, a processing means 8, a recording means 9, and a finder optical system 10 on the inside thereof. Also, a cover member 12 is placed in an opening 11 which is located on the exit sides of the finder opening 2 and of the finder optical system 10 and which is provided on the back side of the digital camera. Also, a cover member 13 is placed also in the shooting opening 1.

When the shutter button 4 arranged on the upper portion of the digital camera is pressed, a shooting is linked to the press of the shutter button 4 and is carried out through the zoom optical system 7, for example, such as the zoom optical system which is described in Embodiment 1. An object image is formed on the image-forming plane of a CCD 7a through the zoom optical system 7, the low-pass filter LF, and the cover glass CG, where the CCD 7a is a solid-state image sensor. The image information about the object image formed on the image-pickup plane of the CCD 7a is recorded on the recording means 9 through the processing means 8. Also, the recorded image information can be taken by the processing means 8, and the taken image information can be also displayed as an electronic image on the liquid crystal display monitor 5 provided on the back side of the camera.

Also, the finder optical system 10 comprises a finder objective optical system 10a, an erecting prism 10b, and an eyepiece optical system 10c. Light coming from an object and entering through the finder opening 2 is led by the finder objective optical system 10a to the erecting prism 10b which is an image-erecting member, and the object image is formed as an erect image in a view frame 10b₁. Thereafter, the object image is led to an eye E of an observer by the eyepiece optical system 10c.

Because the zoom optical system 7 has a high magnification ratio and a small size in the digital camera which is formed in this way, it is possible to secure a good performance as well as to realize downsizing of the digital camera.

What is claimed is:

1. A zoom optical system comprising, in order from an object side:
   a first lens unit with a negative power;
   a second lens unit with a positive power;
   a third lens unit with a positive power; and
   a fourth lens unit;
   wherein a position of the first lens unit and a position of the fourth lens unit are fixed in reference to an image surface, while the second lens unit and the third lens unit are moved along an optical axis for magnification change, to change distances between the respective lens units of the zoom optical system,
   wherein the third lens unit comprises an aperture stop and at least three lens elements that include at least one lens element with a positive power and at least one lens element with a negative power, and a most image-side lens element of the third lens unit is a meniscus lens element with a concave surface facing the image side, and
   wherein the third lens unit comprises, in order from the object side, the aperture stop, a lens element with a positive power, a lens element with a negative power and the meniscus lens element with a concave surface facing the image side, and the following condition (1) is satisfied:

$$-1.0 < HF3g/fw < -0.55 \tag{1}$$

where HF3g is a position of a front principal point of the third lens unit, and fw is a focal length of the entire zoom optical system at a wide-angle end position.

2. The zoom optical system according to claim 1, wherein the second lens unit and the third lens unit are moved along the optical axis for focusing, to change the spacing distances between the respective lens units of the zoom optical system.

3. An image pickup apparatus comprising:
   the zoom optical system according to claim 1; and
   an image pickup element.

4. A zoom optical system comprising, in order from an object side:
   a first lens unit with a negative power;
   a second lens unit with a positive power;
   a third lens unit with a positive power; and
   a fourth lens unit;
   wherein a position of the first lens unit and a position of the fourth lens unit are fixed in reference to an image surface, while the second lens unit and the third lens unit are moved along an optical axis for magnification change, to change distances between the respective lens units of the zoom optical system,
   wherein the third lens unit comprises an aperture stop and at least three lens elements that include at least one lens element with a positive power and at least one lens element with a negative power, and a most imaqe-side lens element of the third lens unit is a meniscus lens element with a concave surface facing the image side, and
   wherein the following condition (1-1) is satisfied:

$$-0.8 < HF3g/fw < -0.57 \tag{1-1}$$

where HF3g is a position of a front principal point of the third lens unit, and fw is a focal length of the entire zoom optical system at a wide-angle end position.

5. A zoom optical system comprising, in order from an object side:
   a first lens unit with a negative power;
   a second lens unit with a positive power;
   a third lens unit with a positive power; and
   a fourth lens unit;
   wherein a position of the first lens unit and a position of the fourth lens unit are fixed in reference to an image surface, while the second lens unit and the third lens unit are moved along an optical axis for magnification change, to change distances between the respective lens units of the zoom optical system,
   wherein the third lens unit comprises an aperture stop and at least three lens elements that include at least one lens element with a positive power and at least one lens element with a negative power, and a most image-side lens element of the third lens unit is a meniscus lens element with a concave surface facing the image side, and
   wherein the third lens unit comprises, in order from the object side, the aperture stop, a lens element with a positive power, a lens element with a negative power and the meniscus lens element with a concave surface facing the image aide, and the following condition (2) is satisfied:

$$0.72 < SD3g/fw < 1.50 \tag{2}$$

where SD3g is a distance from a most object-side lens surface to a most image-side lens surface of the third lens unit, and fw is a focal length of the entire zoom optical system in a wide-angle end position.

6. A zoom optical system comprising, in order from an object side:
   a first lens unit with a negative power;
   a second lens unit with a positive power;
   a third lens unit with a positive power; and
   a fourth lens unit;
   wherein a position of the first lens unit and a position of the fourth lens unit are fixed in reference to an image surface, while the second lens unit and the third lens unit are moved along an optical axis for magnification change, to change distances between the respective lens units of the zoom optical system,
   wherein the third lens unit comprises an aperture stop and at least three lens elements that include at least one lens element with a positive power and at least one lens element with a negative power, and a most image-side lens element of the third lens unit is a meniscus lens element with a concave surface facing the image side, and
   wherein the following condition (2-1) is satisfied:

$$0.73 < SD3g/fw < 1.40 \tag{2-1}$$

where SD3g is a distance from a most object-side lens surface to a most image-side lens surface of the third lens unit, and fw is a focal length of the entire zoom optical system in a wide-angle end position.

7. A zoom optical system comprising, in order from an object side:
   a first lens unit with a negative power;
   a second lens unit with a positive power;
   a third lens unit with a positive power; and
   a fourth lens unit;
   wherein a position of the first lens unit and a position of the fourth lens unit are fixed in reference to an image surface, while the second lens unit and the third lens unit are moved along an optical axis for magnification change, to change distances between the respective lens units of the zoom optical system,
   wherein the third lens unit comprises an aperture stop and at least three lens elements that include at least one lens element with a positive power and at least one lens element with a negative power, and a most image-side lens element of the third lens unit is a meniscus lens element with a concave surface facing the image side, and
   wherein the following conditions (3) and (4) are satisfied:

$$1.40 < ndeo < 1.74 \tag{3}$$

$$15.0 < vdeo < 35.0 \tag{4}$$

where ndeo is a refractive index of a lens element (eo) having a strongest negative power in the third lens unit, and vdeo is an Abbe's number of the lens element (eo) having the strongest negative power in the third lens unit.

8. A zoom optical system comprising, in order from an object side:
   a first lens unit with a negative power;
   a second lens unit with a positive power;
   a third lens unit with a positive power; and
   a fourth lens unit;
   wherein a position of the first lens unit and a position of the fourth lens unit are fixed in reference to an image surface, while the second lens unit and the third lens unit are moved along an optical axis for magnification change, to change distances between the respective lens units of the zoom optical system, wherein the third lens unit comprises an aperture stop and at least three lens elements that include at least one lens element with a positive power and at least one lens element with a negative power, and a most image-side lens element of the third lens unit is a meniscus lens element with a concave surface facing the image side, and wherein the following conditions (3-1) and (4-1) are satisfied:

$$1.47 < ndeo < 1.67 \quad (3\text{-}1)$$

$$16.0 < vdeo < 31.0 \quad (4\text{-}1)$$

where ndeo is a refractive index of a lens element (eo) having a strongest negative power in the third lens unit, and vdeo is an Abbe's number of the lens element (eo) having the strongest negative power in the third lens unit.

9. A zoom optical system comprising, in order from an object side:
    a first lens unit with a negative power;
    a second lens unit with a positive power;
    a third lens unit with a positive power; and
    a fourth lens unit;
    wherein a position of the first lens unit and a position of the fourth lens unit are fixed in reference to an image surface, while the second lens unit and the third lens unit are moved along an optical axis for magnification change, to change distances between the respective lens units of the zoom optical system,
    wherein the third lens unit comprises an aperture stop and at least three lens elements that include at least one lens element with a positive power and at least one lens element with a negative power, and a most image-side lens element of the third lens unit is a meniscus lens element with a concave surface facing the image side, and
    wherein the following condition (5) is satisfied:

$$1.40 < nd < 1.726 \quad (5)$$

where nd is a refractive index of any lens element arranged in or after the second lens unit, excluding a refractive index of a lens element that has a strongest negative refractive power in the third lens unit.

10. A zoom optical system comprising, in order from an object side:
    a first lens unit with a negative power;
    a second lens unit with a positive power;
    a third lens unit with a positive power; and
    a fourth lens unit;
    wherein a position of the first lens unit and a position of the fourth lens unit are fixed in reference to an image surface, while the second lens unit and the third lens unit are moved along an optical axis for magnification change, to change distances between the respective lens units of the zoom optical system,
    wherein the third lens unit comprises an aperture stop and at least three lens elements that include at least one lens element with a positive power and at least one lens element with a negative power, and a most image-side lens element of the third lens unit is a meniscus lens element with a concave surface facing the image side, and
    wherein the following condition (5-1) is satisfied:

$$1.47 < nd < 1.67 \quad (5\text{-}1)$$

where nd is a refractive index of any lens element arranged in or after the second lens unit, excluding a refractive index of a lens element that has a strongest negative refractive power in the third lens unit.

11. A zoom optical system comprising, in order from an object side:
    a first lens unit with a negative power;
    a second lens unit with a positive power;
    a third lens unit with a positive power; and
    a fourth lens unit;
    wherein a position of the first lens unit and a position of the fourth lens unit are fixed in reference to an image surface, while the second lens unit and the third lens unit are moved along an optical axis for magnification change, to change distances between the respective lens units of the zoom optical system,
    wherein the third lens unit comprises an aperture stop and at least three lens elements that include at least one lens element with a positive power and at least one lens element with a negative power, and a most image-side lens element of the third lens unit is a meniscus lens element with a concave surface facing the image side, and
    wherein a most object-side lens surface of the fourth lens unit is convex toward the object side at a peripheral portion within an effective range defined by an effective radius of the most object-side lens surface, to have a stronger positive power at the peripheral portion than at a central portion.

12. The zoom optical system according to claim 11, wherein the following conditions (6) and (7) are satisfied:

$$0.1 < fw/f3g < 3.0 \quad (6)$$

$$-3.0 < f3g/R4g1 < 3.0 \quad (7)$$

where R4g1 is a radius of curvature of the most object-side lens surface of the fourth lens unit at an intersection with the optical axis, f3g is a focal length of the third lens unit, and fw is a focal length of the entire zoom optical system at the wide angle end position.

13. The zoom optical system according to claim 12, wherein the following conditions (6-1) and (7-1) are satisfied:

$$0.4 < fw/f3g < 1.5 \quad (6\text{-}1)$$

$$-1.5 < f3g/R4g1 < 1.5 \quad (7\text{-}1).$$

14. The zoom optical system according to claim 11, wherein the fourth lens unit consists essentially of one lens element.

15. The zoom optical system according to claim 11, wherein the fourth lens unit has a positive power.

* * * * *

UNITED STATES PATENT AND TRADEMARK OFFICE
CERTIFICATE OF CORRECTION

| | |
|---|---|
| PATENT NO. | : 8,331,033 B2 |
| APPLICATION NO. | : 12/661725 |
| DATED | : December 11, 2012 |
| INVENTOR(S) | : K. Matsuo |

It is certified that error appears in the above-identified patent and that said Letters Patent is hereby corrected as shown below:

In the Claims:

Column 29, line 11, change "to change the spacing distances" to -- to change distances --.

Signed and Sealed this
Thirtieth Day of April, 2013

Teresa Stanek Rea
*Acting Director of the United States Patent and Trademark Office*